(12) United States Patent
Garrett

(10) Patent No.: US 7,971,386 B2
(45) Date of Patent: Jul. 5, 2011

(54) SYSTEM AND METHOD FOR TROLLING

(76) Inventor: Ronald R. Garrett, Dryden, MI (US)

( * ) Notice: Subject to any disclaimer, the term of this patent is extended or adjusted under 35 U.S.C. 154(b) by 1087 days.

(21) Appl. No.: 11/707,687

(22) Filed: Feb. 16, 2007

(65) Prior Publication Data

US 2007/0193107 A1 Aug. 23, 2007

Related U.S. Application Data

(60) Provisional application No. 60/774,941, filed on Feb. 17, 2006.

(51) Int. Cl.
*A01K 91/00* (2006.01)

(52) U.S. Cl. .................................................. 43/43.13

(58) Field of Classification Search ............... 43/26.1, 43/26.2, 27.2, 43.12, 43.13, 9.7; 114/145 R, 114/145 A
See application file for complete search history.

(56) References Cited

U.S. PATENT DOCUMENTS

| | | | |
|---|---|---|---|
| 1,395,580 A * | 11/1921 | Jonezic ....................... 114/145 R |
| 2,994,290 A * | 8/1961 | Merchant, Sr. ............ 114/145 R |
| 3,181,266 A * | 5/1965 | Lenfvenius .................. 43/43.13 |
| 3,818,624 A * | 6/1974 | Duffy ............................ 43/43.13 |
| 4,745,702 A * | 5/1988 | Koch ........................... 43/43.13 |
| 4,763,437 A * | 8/1988 | Cuda ............................ 43/43.13 |
| 4,798,021 A | 1/1989 | Miklos |
| 4,856,222 A | 8/1989 | Hannam |
| 4,864,768 A | 9/1989 | Schock |
| 5,035,075 A | 7/1991 | Pearce |
| 5,185,950 A | 2/1993 | Hood |
| 5,428,916 A | 7/1995 | Dubriske |
| 5,595,013 A | 1/1997 | Dubriske |
| 5,829,184 A | 11/1998 | Studanski |
| 5,867,932 A | 2/1999 | Reiger |
| 5,988,091 A * | 11/1999 | Willis ........................ 114/145 R |
| 6,412,215 B1 | 7/2002 | Even |
| 6,453,600 B1 | 9/2002 | Craig |
| 6,606,959 B1 * | 8/2003 | Shen ............................. 114/271 |
| 6,760,995 B2 | 7/2004 | Mueller |
| 6,789,350 B1 | 9/2004 | Link |
| 6,813,856 B1 | 11/2004 | Sitkewicz et al. |
| 6,874,271 B2 | 4/2005 | Lieb |
| 7,055,280 B2 * | 6/2006 | Shen et al. .................... 43/26.1 |
| 2002/0095851 A1 | 7/2002 | Petry |
| 2005/0138857 A1 | 6/2005 | Markley et al. |

* cited by examiner

*Primary Examiner* — Kimberly S Smith

(57) ABSTRACT

A system is disclosed that includes a selectively positionable brake for a towed fishing body. Additionally, a system is disclosed that includes a speed control for a planer board. The planer board is used for fishing by being towed through water. Moreover, a method is disclosed including positioning a brake attached to a towed fishing body.

19 Claims, 22 Drawing Sheets

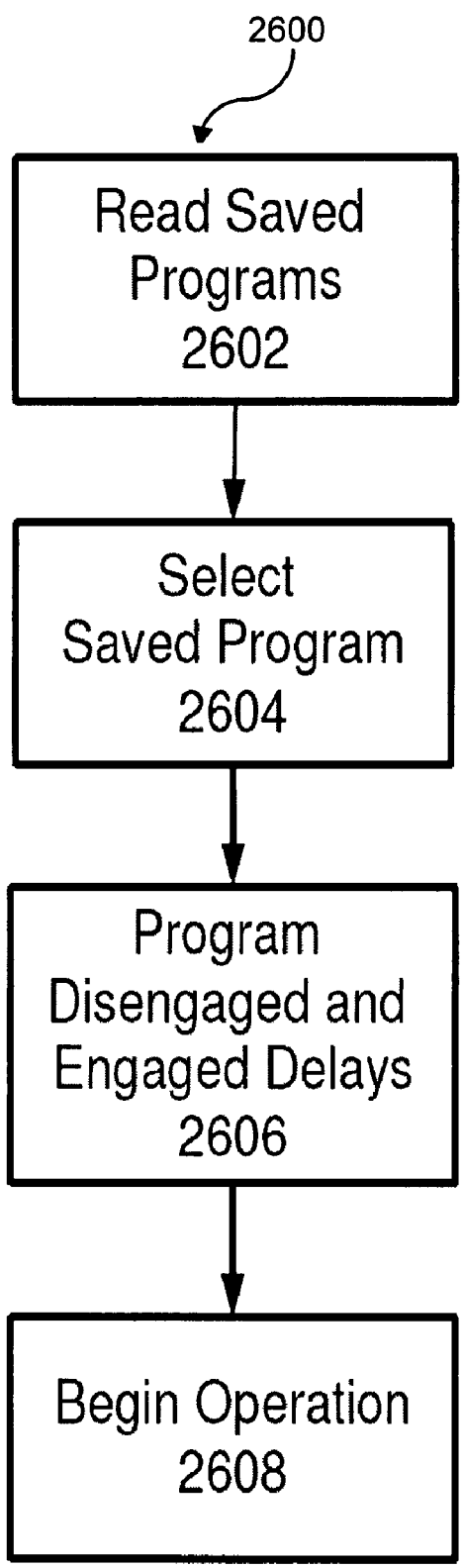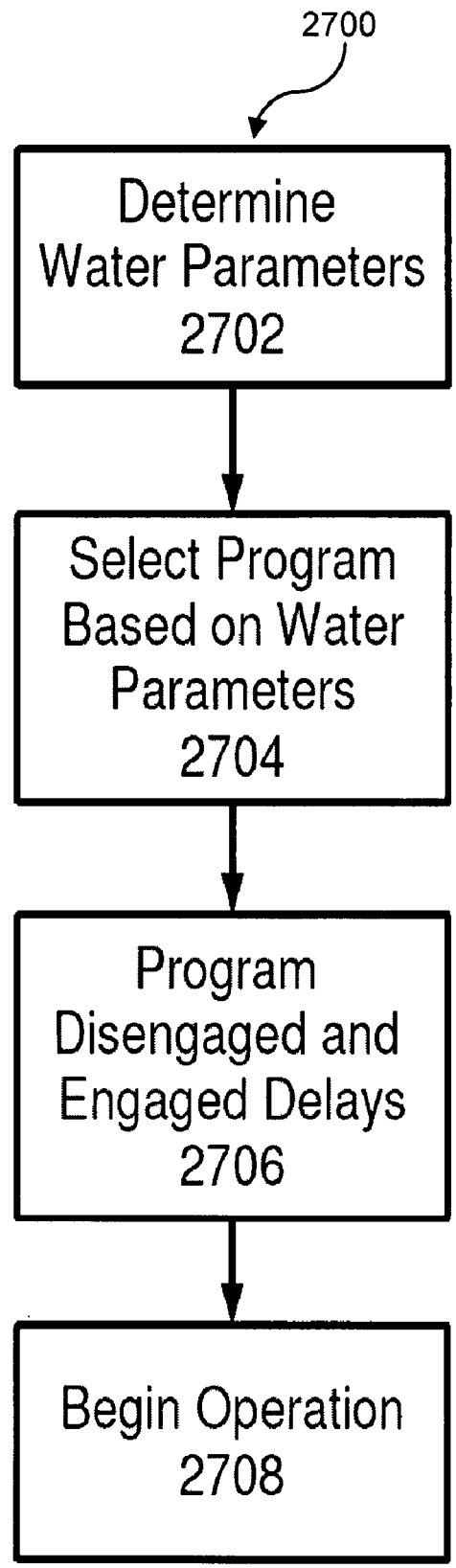
*FIG. 23*                *FIG. 24*

SYSTEM AND METHOD FOR TROLLING

RELATED APPLICATIONS

This application claims priority to U.S. Provisional Application No. 60/774,941, entitled "SYSTEM AND METHOD FOR TROLLING," filed Feb. 17, 2006, the entirety of which is hereby included by reference.

TECHNICAL FIELD

The embodiments described herein are generally directed to fishing equipment, and more particularly to fishing tackle.

BACKGROUND

Fishermen typically use trolling techniques on bodies of water to catch fish. One method of trolling includes running multiple lines from the back of the boat. To provide a life-like "action" to a fishing tackle component (in one example a lure), a fisherman would "pump" the lure by moving the rod in and out such that the lure would rise and fall in the water at periodic intervals. This "jigging" action is known to attract fish to lures. However, a rear-dragging line method is prone to tangling of lures when more than one rod is in use. Further, if a fisherman were to "pump" the lures, another fisherman would have to be in control of the boat. Additionally, where multiple rods and lures are used, a fisherman may be disenchanted with the necessity of continuously changing rods in order to "pump" each lure.

To solve the problems of line-tangling with rear-dragging lures, planer boards have begun to enter the sport-fishing arena as a method to improve fishing success. Planer boards are typically buoyant plastic or wooden structures that are pulled behind or along side a boat. The most common planer board is a plastic side-planer that maintains a predetermined distance from either side of the boat, as determined by the fishermen. When using planer boards, multiple lines may be pulled behind the boat and, because they are positioned at various distances, they are not prone to interference or tangling with each other's lines. Thus, the use of planer boards is more efficient than using a single fishing line or a rear-dragging setup.

When fishing, the planer boards are positioned behind the boat, or on the sides of the boat, and a trolling speed is determined. A typical trolling speed is between one half (½) mile per hour and two (2) miles per hour, depending on water conditions. When setting up and deploying the planer boards, a higher speed may be used to increase the line feed rate in order to reduce the deployment time of the planer boards (i.e., when a faster speed is used the line is let out more rapidly). Four or more planer boards may be used to increase the number of lines in the water and to increase the chances for fish strikes. A fisherman may also use downriggers along with the planer boards to maximize fishing opportunities.

When using multiple planer boards (typically side planer boards) fishermen adjust trolling methods in an attempt to make the lures more enticing to the fish. One method using planer boards is to turn the boat periodically so that the lure behaves in a more life-like manner. By turning the boat, generally using a constant series of S-turns or zigzag motions, the lure will slow momentarily at the beginning of a turn and then speed up as the line tension increases through the turn. This method provides the lure with a life-like "action" in that live bait does not move through the water with steady-state motion. By providing "action" to the lure, or periodic changes in movement of the lure, a fish is more likely to attack the lure. Thus, the "action" provides more strikes than simply trolling in a straight line at a constant speed. However, the turning method requires the constant attention of the boat operator/fisherman to perform the turns. Thus, the fisherman is less likely to see a "strike" because he is concentrating on the turns rather than watching the planer boards for a strike indication. When the fisherman is distracted, a fish has a greater chance of escaping the lure's hook.

Another method of providing "action" to bait is to operate the boat's throttle such that the boat slows and speeds up periodically. This method may also be performed by taking the boat in and out of gear. Using the variable boat-speed method, the lure or bait will slow down and increase speed periodically along with the boat. This method, however, increases wear and tear on the propulsion systems of the boat. By constantly adjusting speed, the throttle linkages, as well as the motor mechanisms are under constant changes in conditions that increase stress on the components.

In use, the boat-turning and throttling method require a great amount of attention of the boat operator. Additionally, even the most attentive boat operator cannot provide for consistent "action" of the lure. Thus, the lure will not be consistently moving in a periodic fashion. This inconsistency leads to the inability to fine tune the lure's action for the fishing conditions at hand. For example, when fishing in a tournament, a fisherman may attempt to determine the optimum conditions for the lure's action early on in the tournament, or during practice. When the tournament begins, the fisherman may adjust the operation of the boat with the throttle or turning to tune the boat movements to the fishing conditions. In the trial and error period, the fishing conditions may include water temperature, weather conditions, boat and water speed, clarity of the water, depth of the water, and, of course, the type of fish sought. Additional considerations for the operation of the planer board include the lure type, color, size, and desired running-depth of the lure.

Beyond the aforementioned problems, a fisherman who uses the boat speed-adjusting technique or the turning technique will not find success over time. This is because there is little chance of repeatability for the given conditions. The fisherman/boat operator is not capable of providing a consistent "action" pattern to the lure. Further, over days, weeks, or even seasons, the fisherman's perspective of time in turns, or in throttle up/down times, will not be consistent. Thus, over time, the aforementioned techniques will not provide reliable "action" to the lure and reliable success in catching fish.

Accordingly, it is preferred to provide "action" to a fishing lure when trolling that improves fishing consistency. Preferably, the fisherman would be unburdened from constantly turning the boat or adjusting the boat's speed to provide the lure "action." Thus, it is preferable to provide "action" to the lure while the boat is moving at a constant speed and without changing direction. It is further preferred to reduce the wear-and-tear on the boat's equipment. It is additionally preferred to provide for consistent "action" of the lure.

SUMMARY

Fishermen are provided with a system and method significantly advancing trolling. A trolling system provides for control of a lure for depth and speed. The control of which is localized to the trolling system at a planer board, rather than requiring control of a boat or physical control of the rod to impart motion to the lure. Further, speed and depth control are programmable, variable, and repeatable using a control system and a brake. Having a trolling system unburdens a fisherman from attempting to control the lure through the motion of the boat, and now allows the fisherman to concentrate on other fishing strategies, while at the same time, the lure is behaving a manner known to attract fish strikes. Thus, the trolling system captures the critical aspects of lure depth and speed variation in a programmable system that does not require intervention or attention of the fisherman.

A system is disclosed that includes a selectively positionable brake for a towed fishing body. Additionally, a system is disclosed that includes a speed control for a planer board. The planer board is used for fishing by being towed through water. Moreover, a method is disclosed including positioning a brake attached to a towed fishing body.

BRIEF DESCRIPTION OF THE DRAWINGS

The features and inventive aspects of the embodiments will become more apparent upon reading the following detailed description, claims, and drawings, of which the following is a brief description:

FIG. 23 is a flow diagram of the operation of the brake using stored parameters for the trolling system of FIG. 3;

FIG. 24 is a flow diagram of the operation using water parameters for the trolling system of FIG. 3;

DETAILED DESCRIPTION

Figure 1:
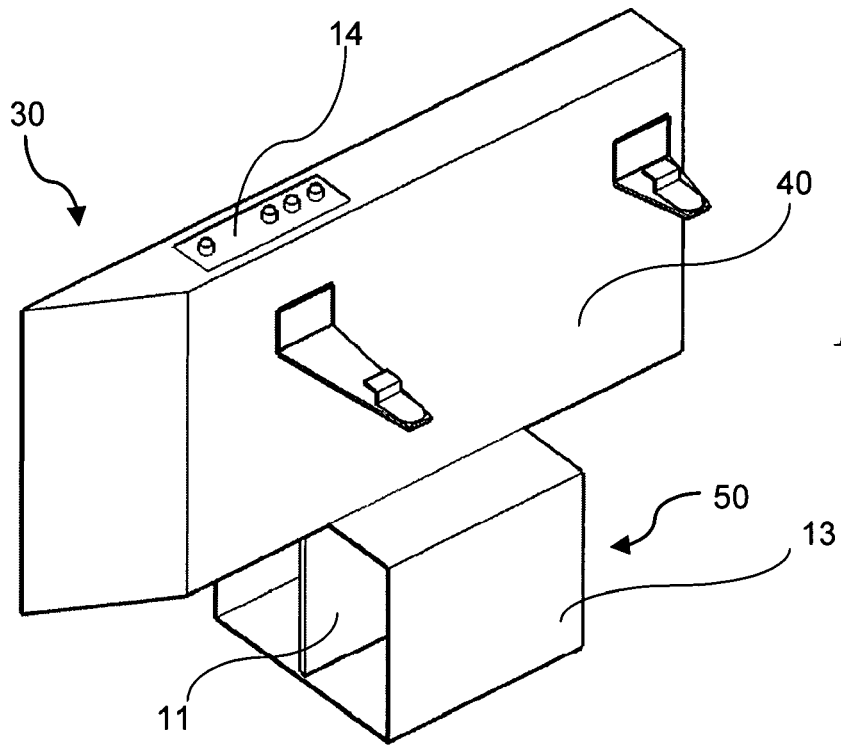
FIG. 1 is a side perspective view of an embodiment of a system for trolling having a disengaged brake.

Referring now to the drawings, illustrative embodiments are shown in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limit or restrict the invention to the precise form and configuration shown in the drawings and disclosed in the following detailed description.

FIG. 1 is a side perspective view of a first embodiment of a system for trolling 30 having a brake 50 in a disengaged position. In general, a planer board 40 is configured for attachment to a line for being pulled through water. Brake 50 is in a disengaged position where a shutter 11 is in an open position, allowing for flow of water through a housing 13. Internal to planer board 40 is an actuator (not shown) that is connected to shutter 11. A programmable control module 14 controls the actuator to selectively position shutter 11 in an engaged position and a disengaged position (shown in FIG. 2). The operation and configuration of system for trolling 30 is described in detail herein.

Figure 2:
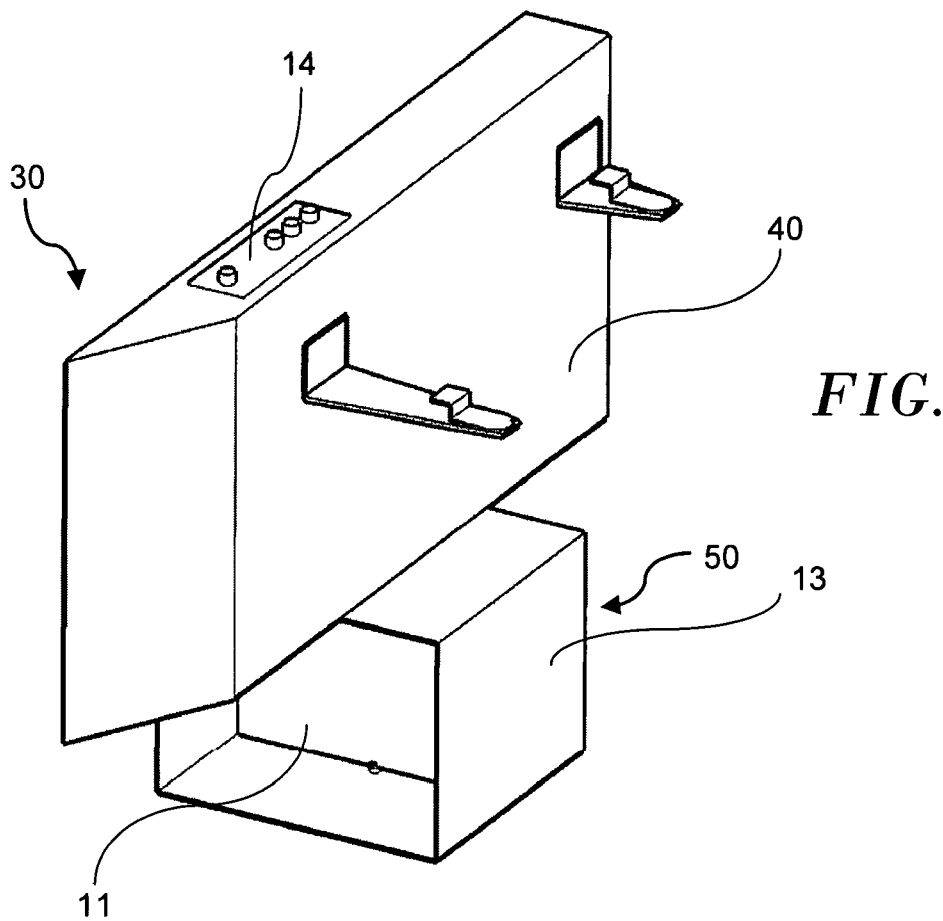
FIG. 2 is a side perspective view of an embodiment of a system for trolling having an engaged brake.

FIG. 2 is a side perspective view of the embodiment of FIG. 1 having an engaged brake 50. As shown, engaged brake 50 is positioned to substantially interfere with water flow through housing 13 when planer board 40 is towed through water. Control module 14 selectively positions shutter 11 using an actuator to allow or block water flow through housing 13. In this way, the speed of planer board 40 is controlled, as is any lure or fishing tackle towed from planer board 40. Moreover, as described in detail below, a lure is typically pulled by planer board 40 and is given life-like "action" by the slowing down motion (when brake 50 is engaged) and speeding up motion (when brake 50 is disengaged) provided by the actuation of brake 50.

The embodiments described herein reference a starboard-side planer board. However, the systems and methods are equally applicable to port-side planer boards as well as in-line planer boards that are not biased toward a side of the boat and generally run directly behind the towing line. Moreover, the systems and methods described herein are applicable to other types of towed fishing bodies such as downriggers and lures.

Figure 3:
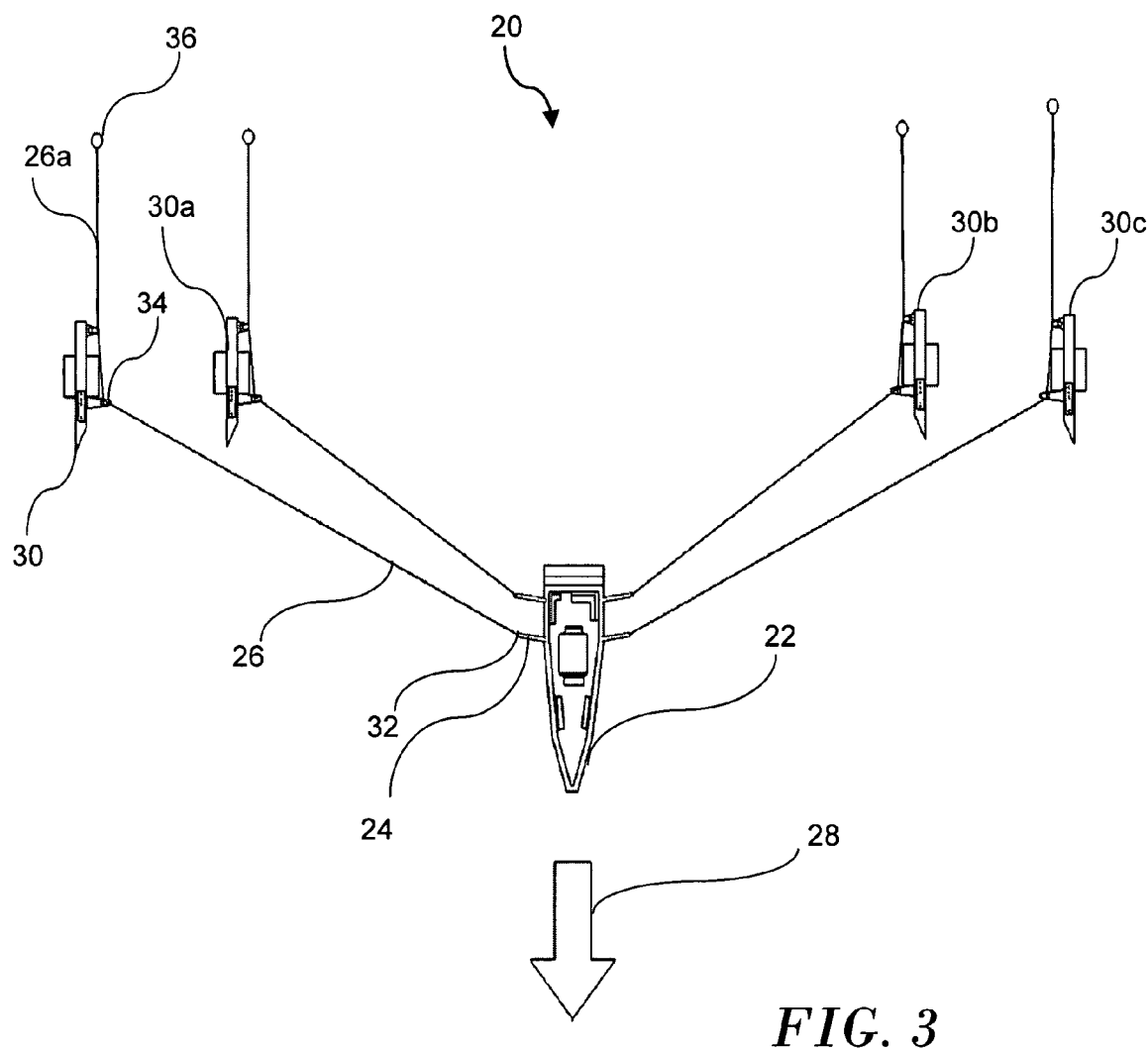
FIG. 3 is a top plan view of a system and method for trolling using a quad planer-board setup.

Referring now to FIG. 3, a top view of a trolling setup 20 is shown including a boat 22, a rod 24, a line 26, and a trolling system 30. Boat 22 may be propelled through water in a travel direction 28 using conventional motor systems such as an inboard motor(s), an outboard motor(s), and a trolling motor(s). Rod 24 is selectively connected to boat 22 by rod holders (not shown). Line 26 is affixed at a first end 32 to rod 24 (typically using a rod and reel setup) and at a second end 34 to trolling system 30.

During the implementation of trolling setup 20, rod 24 is typically temporarily disconnected from boat 22 to allow a fisherman to attach trolling system 30 to second end 34. Then, the fisherman may place trolling system 30 in the water and may begin letting out line from the reel to position trolling system 30 at a desired nominal distance behind boat 22. The implementation procedure may be repeated for other trolling systems 30a, 30b, and 30c. When trolling setup 20 is complete, a lure 36 is pulled through the water by a leader 26a that is a further extension of line 26.

Figure 4A:
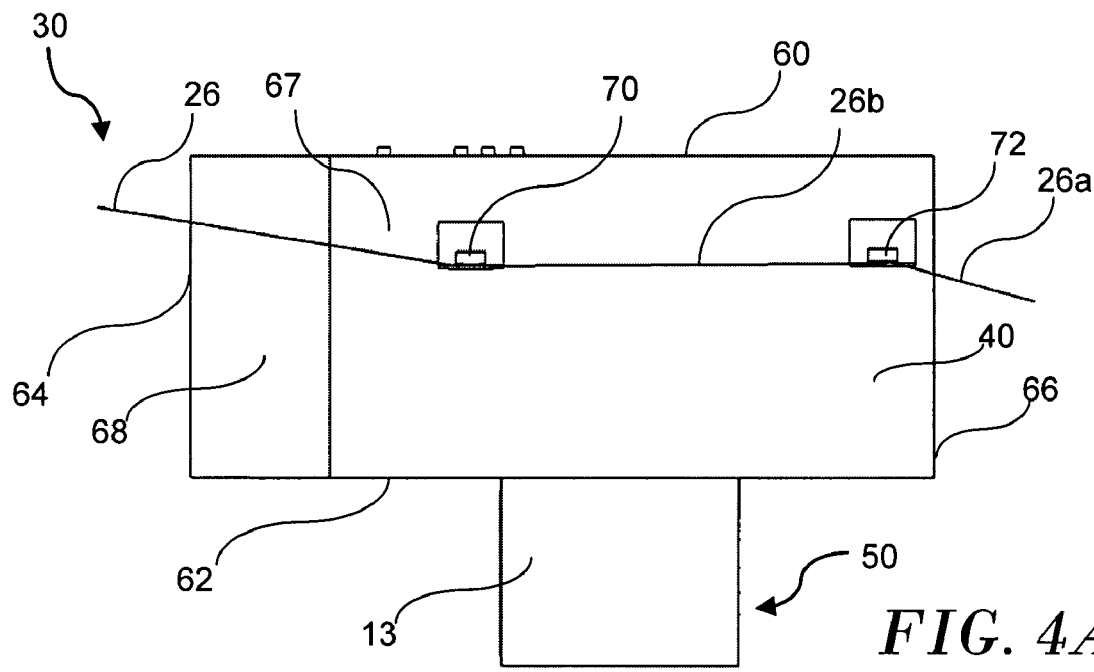
FIG. 4A is a side view of an embodiment for use with the of the system of FIG. 3.
Figure 4B:
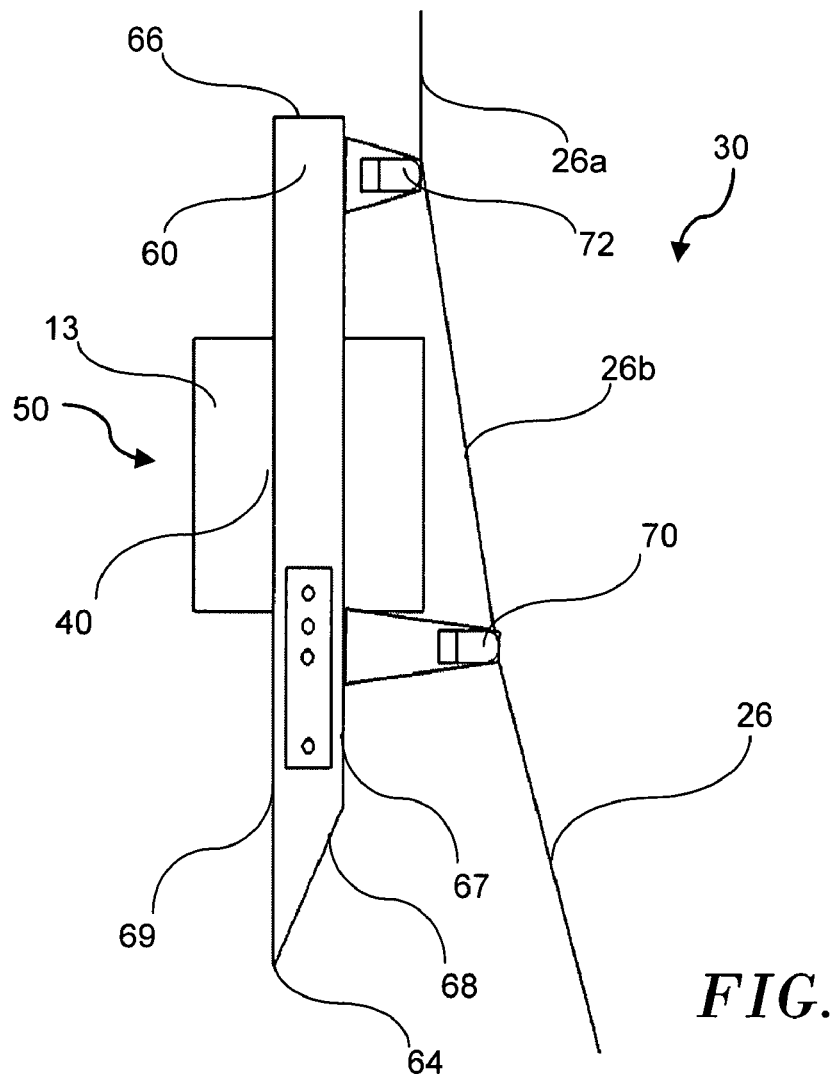
FIG. 4B is a top view of the embodiment of FIG. 4A for use with of the system of FIG. 3.

Now turning to FIGS. 4A and 4B, an embodiment of trolling system 30 includes planer board 40 and brake 50. Planer board 40 further includes a top side 60, a bottom side 62, an inboard side 67, an outboard side 69, a leading edge 64, a trailing edge 66, a bias portion 68, a pulling attachment point 70, and a lure attachment point 72. Pulling attachment point 70 and lure attachment point 72 are shown as spring-clip type quick connects. However, other methods of line attachment for towing are also contemplated. Brake 50 (explained in detail with respect to FIGS. 5A-5C) is positioned at bottom side 62 of planer board 40 and is generally positioned underwater when in use.

Planer board 40 may be made of plastic material and preferably includes a buoyant portion such that planer board 40 is automatically oriented in the water properly. As is known to those skilled in the art, planer board 40 may also be constructed of wood or foam. Further, the balance of planer board 40 is important so that, when towed, the board slices through the water in an upright position.

Planer board 40 is attached to line 26 at pulling attachment point 70 allowing boat 22 to pull planer board 40 through the water connected by line 26. Line 26 is further attached near trailing edge 66 at lure attachment point 72. An intermediate segment 26b of line 26 is strung between pulling attachment point 70 and lure attachment point 72. Lure 36 trails behind trolling system 30 by its connection with leader 26a. (See FIG. 3). In general, pulling attachment point 70 and lure attachment point 72 may be configured as clips, pinchers, or other configurations that do not allow slippage of line 26 therethrough.

Figure 5:
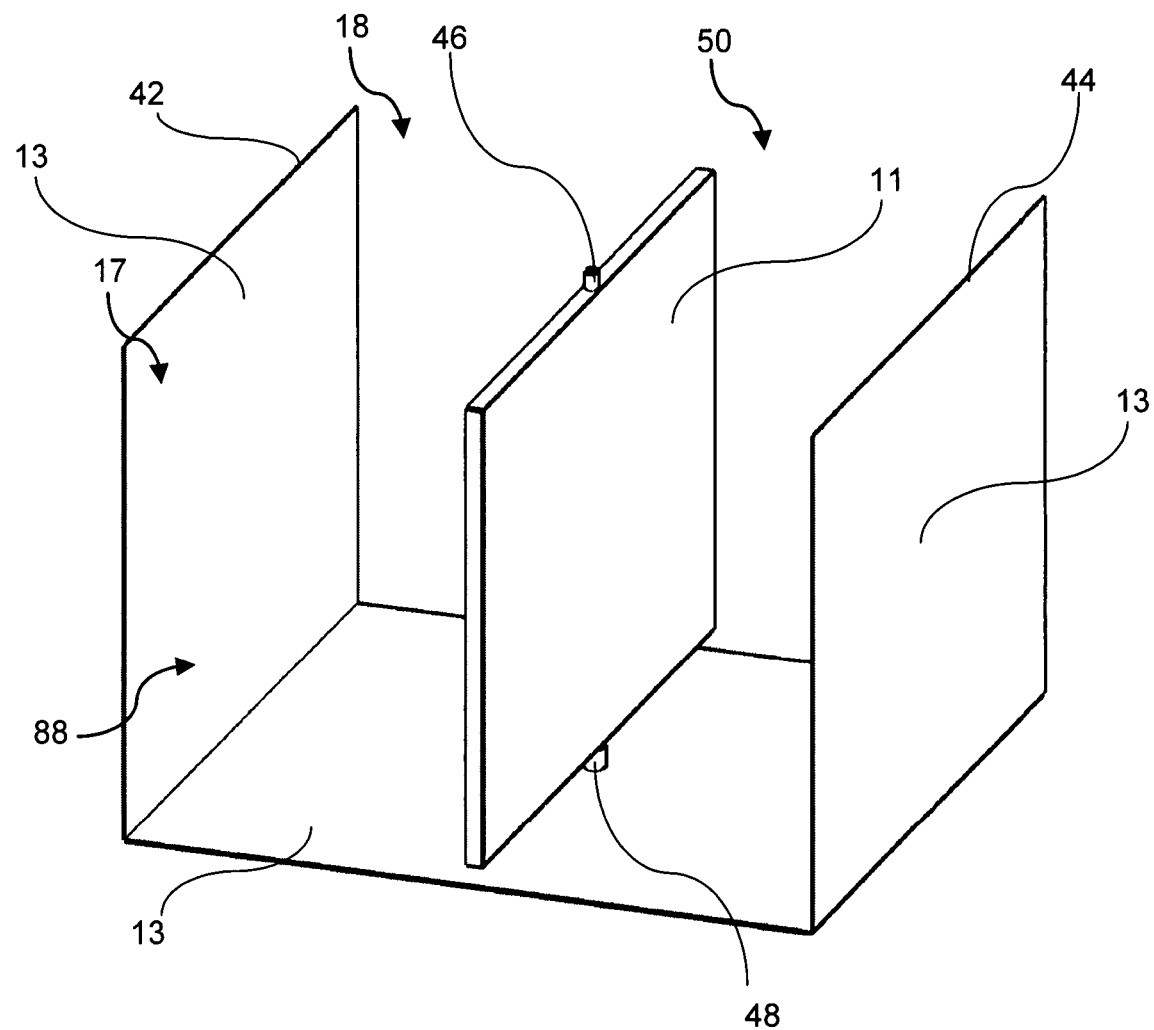
FIG. 5 is a perspective view of a brake for use with the system of FIGS. 4A and 4B.

FIG. 5 illustrates a perspective view of brake 50 including shutter 11, housing 13, and pivot points 46, 48. An axel may be placed between pivot points 46, 48 through shutter 11, or pivot points 46, 48 may be part of shutter 11. Other embodiments may include pivot points 46, 48 as part of housing 13. Moreover, housing 13 may include holes or depressions for receiving pivot points 46, 48. Housing 13 is generally box-shaped and includes a channel 88 therethrough that allows for the placement of shutter 11 within. For clarity, an upper portion of housing 13 is not shown that spans a first upper edge 42 and a second upper edge 44 (the upper portion of housing 13 is shown in FIG. 1). Housing 13 generally protects shutter 11 from damage. Channel 88 allows water to flow through housing 13 when towed in the water. Shutter 11, in this embodiment, is a flat plate. As shown, pivot points 46, 48 allow shutter 11 to rotate within housing 13.

Shutter 11 is an embodiment of a selectively positionable brake for planer board 40. The selective positioning is derived from the movement, or in this embodiment, a rotation of shutter 11 as a moveable surface. Housing 13 includes an inlet 17 and an outlet 18 for water passing therethrough. When brake 50 is engaged, shutter 11 is positioned such that water passage is blocked near to shutter 11. When brake 50 is disengaged, shutter 11 is positioned such that water is allowed to flow past. Although the embodiment shows a housing 13, brake 50 operates without housing 13. In the embodiments shown herein, housing 13 is used to protect shutter 11 while not in use (e.g., when placed in storage or while being setup or handled).

In an embodiment, brake 50 is constructed of stainless steel. This allows brake 50 to also operate as ballast for planer board 40, assisting in maintaining planer board 40 upright in water. Housing 13 may be constructed of sheet material that is folded or cut and subsequently welded or bonded together to form housing 13. Alternatively, housing 13 may be constructed from a predetermined length of extruded material. Shutter 11 may be a cut or formed piece of sheet material. The construction of housing 13 and/or shutter 11 of metal allows for a significant mass located near bottom side 62 of planer board 40. Further, stainless steel is non-reactive in normal freshwater bodies of water providing for minimal rust or other degradation.

In an alternative embodiment, the components of brake 50 may be constructed of plastic. Indeed, the components may be molded components. However, brake 50 may also be constructed of materials, or combinations of materials, that provide strength and environmental ruggedness.

Figure 6A:
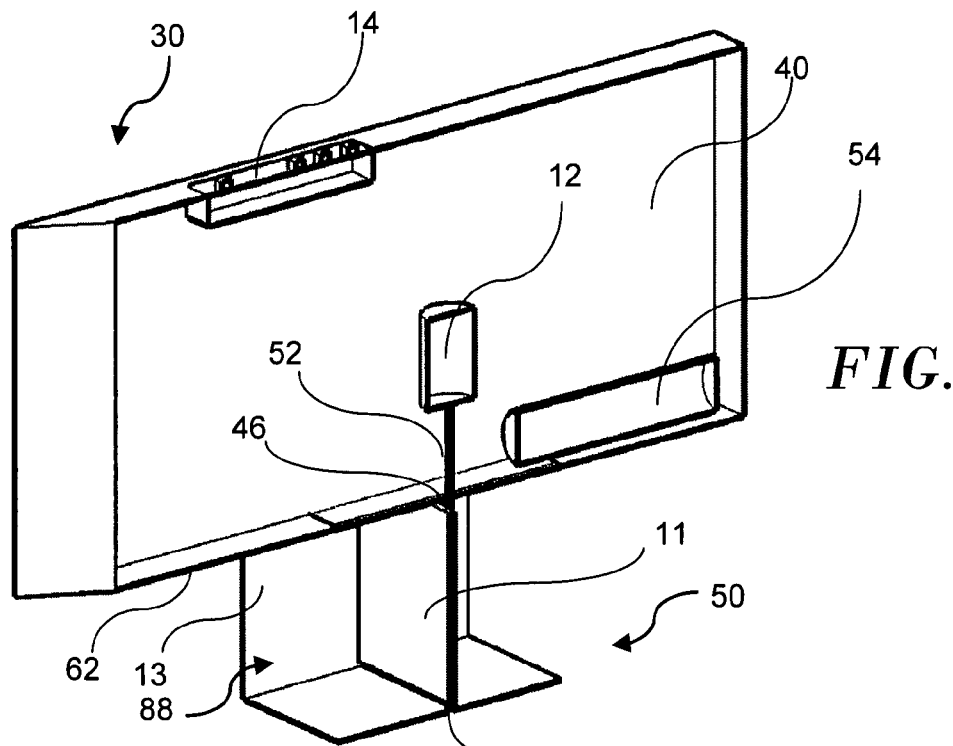
FIG. 6A is a side perspective cross-sectional view of a brake when engaged.
Figure 6B:
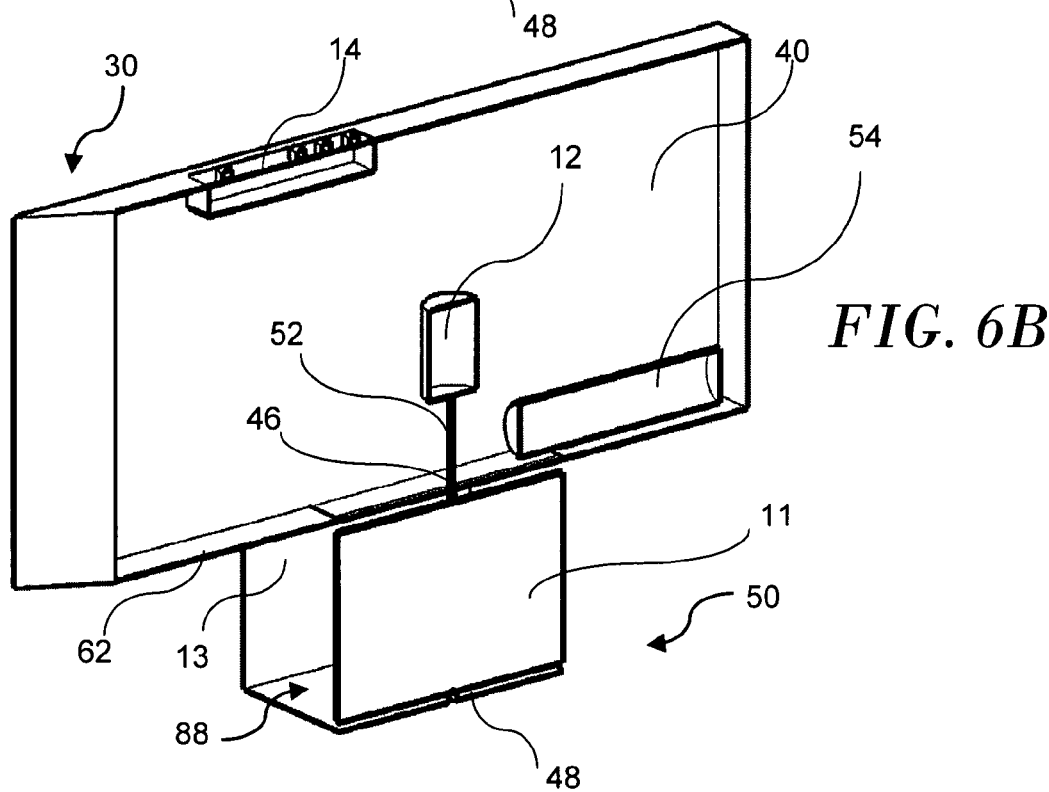
FIG. 6B is a side perspective cross-sectional view of a brake when disengaged.

FIG. 6A is a perspective cross-sectional view of brake 50 when engaged. Brake 50 is attached to bottom side 62 of planer board 40. With brake 50 in an engaged position, shutter 11 is rotated about pivot points 46, 48 to a closed position to substantially minimize channel 88, thereby blocking water flow through housing 13. In alternative embodiments, shutter 11 may completely close-off channel 88 through housing 13. Control module 14 is programmed to operate an actuator 210 that, in this embodiment, rotates shutter 11 via a direct-drive shaft 52. A battery 54 provides power for control module 14 and actuator 210. FIG. 6B is perspective cross-sectional view of brake 50 when disengaged. When disengaged, shutter 11 is rotated to an open position to substantially maximize channel 88 through housing 13, allowing for the free flow of water through housing 13.

Figure 7A:
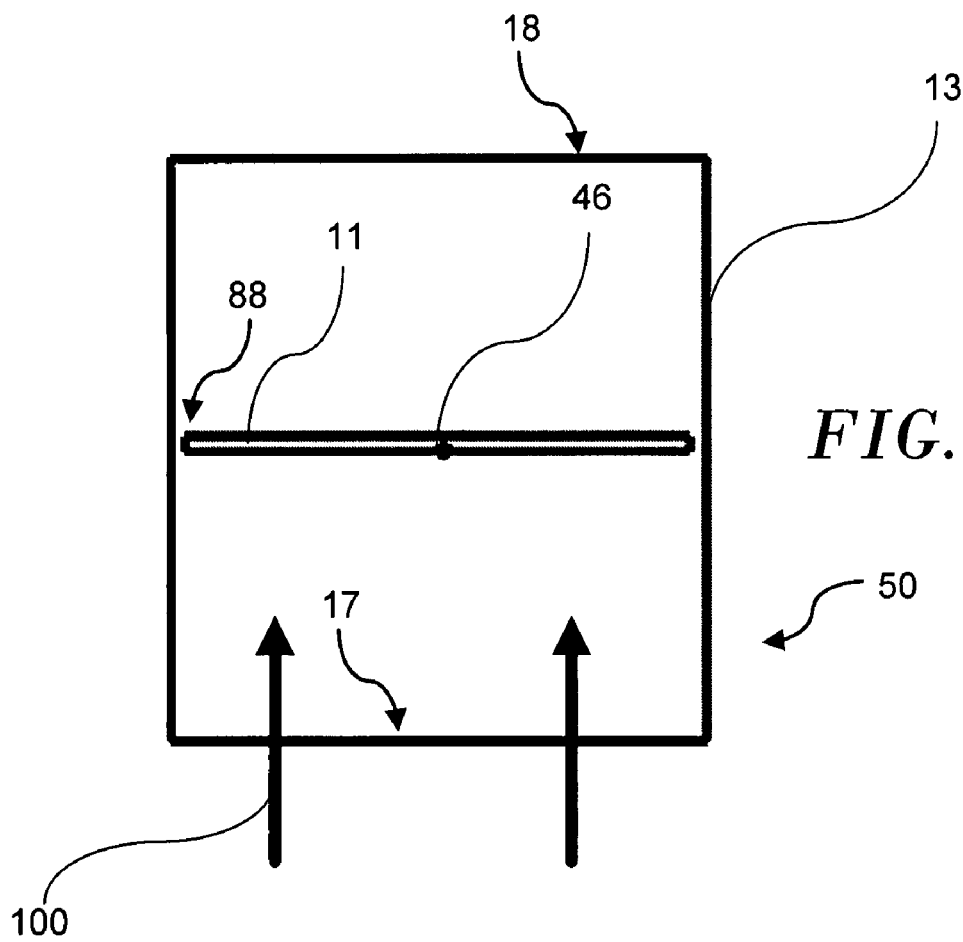
FIG. 7A is a top cross-section view of the brake of FIG. 6A illustrating reduced water flow proximal to the brake when engaged.
Figure 7B:
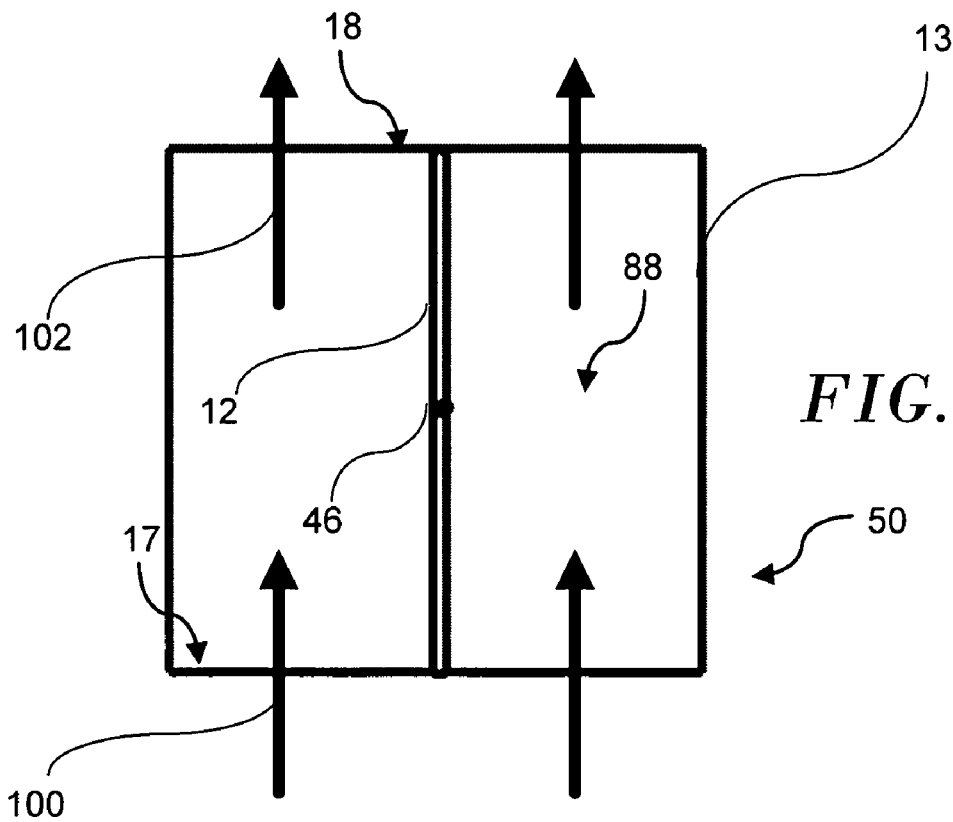
FIG. 7B is a top cross-section view of the brake of FIG. 6B illustrating unimpeded water flow proximal to the brake when disengaged.

FIGS. 7A and 7B illustrate the operation of brake 50 as trolling system 30 is towed through water. It is understood that brake 50 is also applicable to other types of towed fishing bodies. FIG. 7A illustrates a cross-section of brake 50 in an engaged position, e.g. where shutter 11 blocks the water's path through housing 13. An entering current 100 (shown by arrows) is provided by the motion of trolling system 30 as it is being pulled or towed through water. Shutter 11 substantially closes off channel 88 and prevents entering current from passing through brake 50. Thus, a resistive force is provided to trolling system 30 as it is pulled through water by blocking entering current 100. In this embodiment, the resistive force of brake 50 is substantially against the pulling or towing force.

As shown in FIG. 7B, brake 50 may be disengaged by selectively positioning shutter 11 to an open position such that channel 88 is maximized. Thus, entering current 100 is provided an unobstructed path through housing 13. In the open, or disengaged position, entering current 100 passes through channel 88 and is substantially undisturbed resulting in the flow of exit current 102. In allowing entering current to be substantially undisturbed, the resistive force applied to trolling system 30 is minimized.

In this embodiment, brake 50 is positioned underwater and is located under planer board 40 (see FIGS. 6A and 6B) to provide a laterally and longitudinally balanced resistive force to planer board 40. However, alternative embodiments may include unbalanced configurations that may provide more resistive force to one of the sides 67, 69 or to leading edge 64 or trailing edge 66 of planer board 40. Further, brake 50 may be configured to provide lift to raise planer board 40 higher in the water. Thus, when brake 50 is disengaged, planer board 40 is raised out of the water and less resistive force is applied by the water to the body of planer board 40. Alternatively, brake 50 may be configured with a partial housing 13.

Figure 8A:
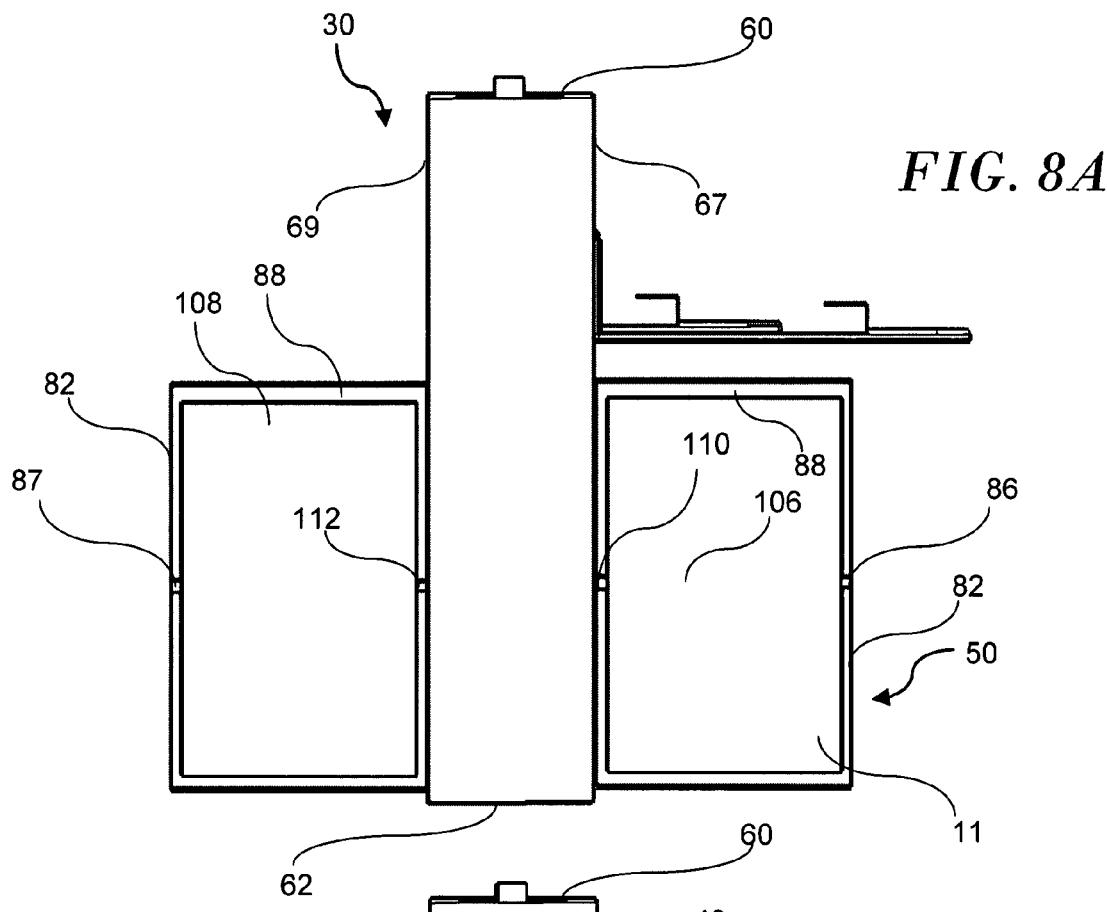
FIG. 8A is a front view of an alternative embodiment of the trolling system of FIG. 3, having a brake on both sides of the planer board, where the brake is engaged.
Figure 8B:
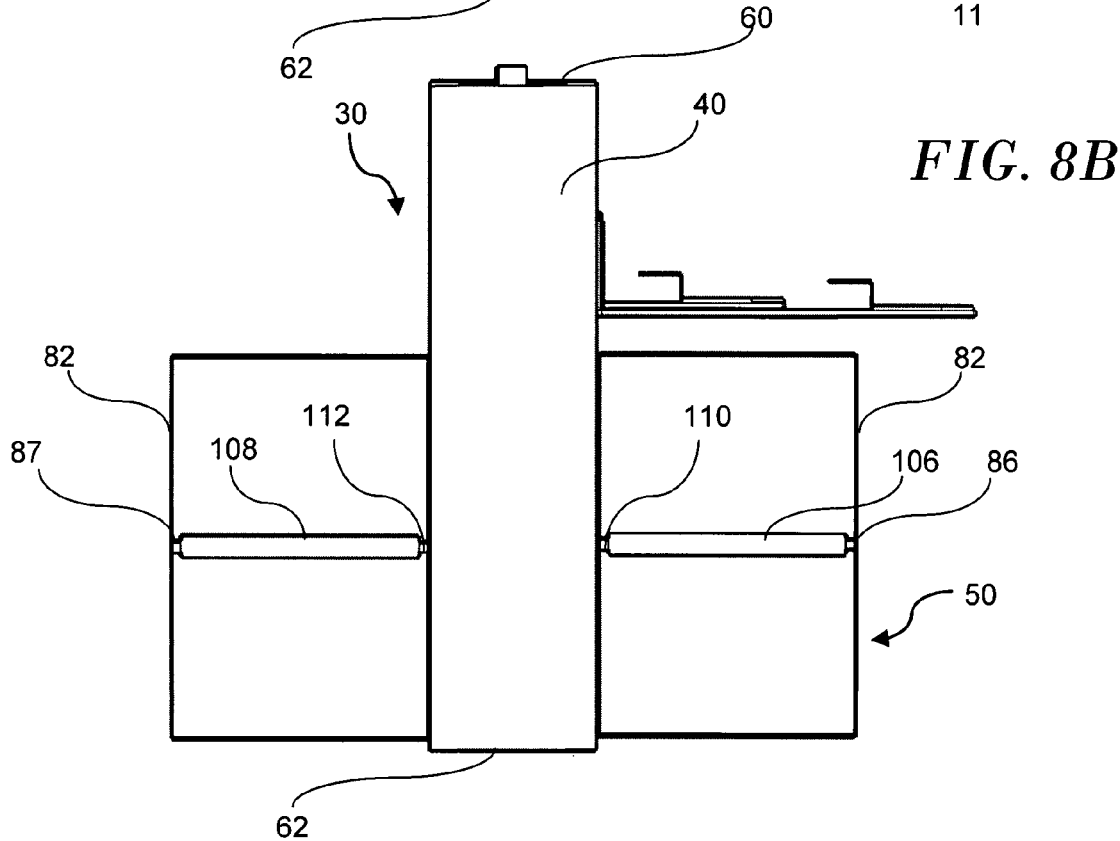
FIG. 8B is a front view of the embodiment of FIG. 8A where the brake is disengaged.

Referring now to FIGS. 8A and 8B, an alternative embodiment of trolling system 30 is shown. In this embodiment, brake 50 is provided as a two-part balanced system, including shutters 106, 108 mounted on sides 67, 69 on the lower portion of planer board 40. Thus, shutters 106, 108 are substantially under water when planer board 40 is in use. Advantages of a balanced setup of brake 50 include a straight pull through the water where positioning of planer board 40 is determined by bias portion 68 (shown in FIGS. 4A and 4B). However, the general towed direction of planer board 40 may be modified by adding an imbalance through the selective use of one side, or both sides, of brake 50 to steer planer board 40 in the water (e.g., the opening of shutter 106 and the closing of shutter 108, or the opposite). Indeed, such a dual shutter setup allows for the braking and steering of planer board 40.

In this embodiment, an axel connects shutters 106, 108 and provides for selective rotation about pivot points 86, 87, 110, 112 to allow for the opening and closure of shutters 106, 108 and channel 88. The balanced configuration allows for a fisherman to selectively attach ballast to bottom side 62 to fine tune the riding position (e.g. the portion of planer board 40 under and above water) of trolling system 30. Further, the strength of brake 50 may be increased by a greater contact area with planer board 40, thereby reducing the risk of breakage. Additionally, the balanced configuration allows for a modified riding position of trolling system 30 on the water with shutters 106, 108 open (see FIG. 8B) and closed (see FIG. 8A).

Figure 9:
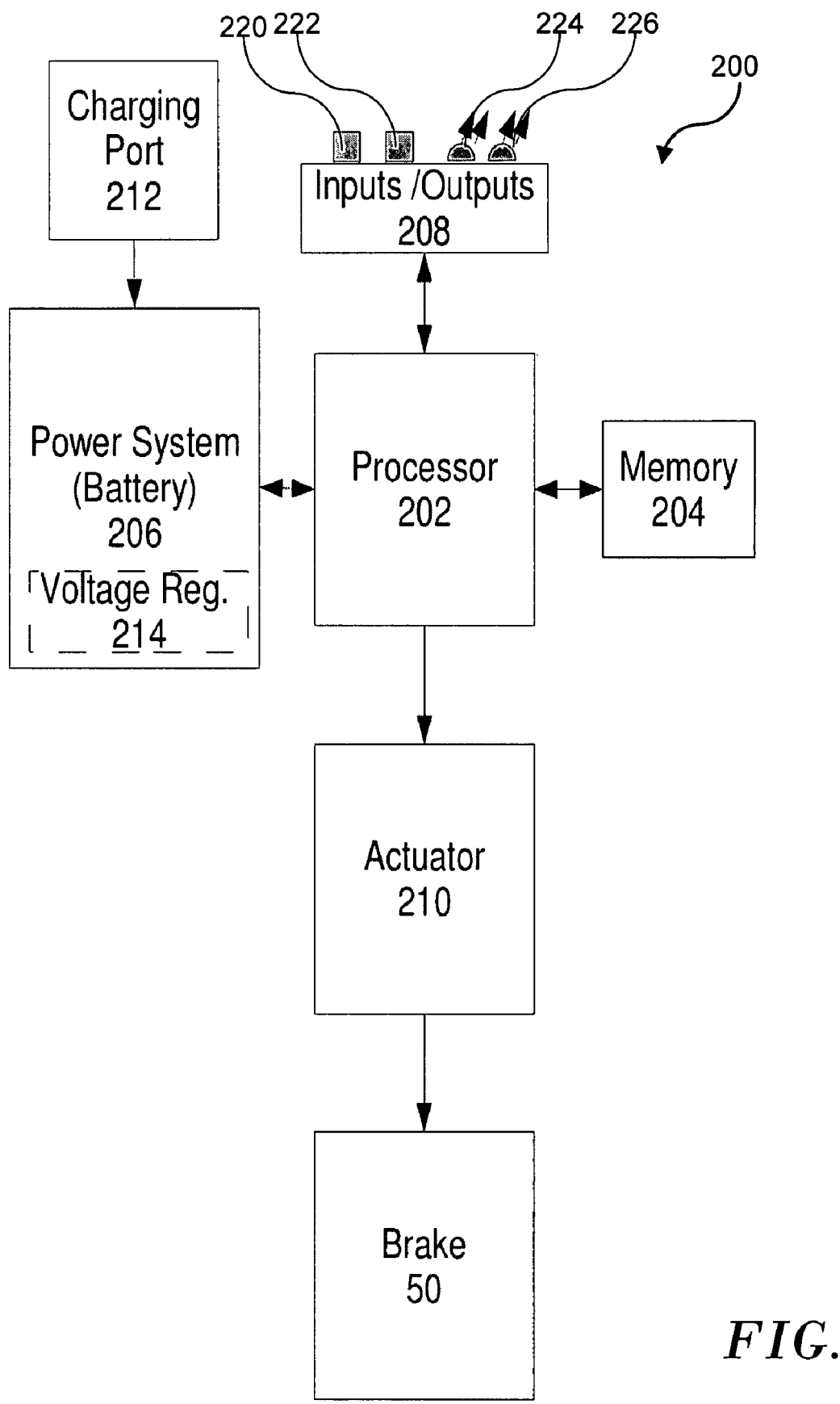
FIG. 9 is a system diagram of a controller system for the trolling system of FIG. 3.

Now turning to FIG. 9, a controller system 200 is shown for trolling system 30. Controller system 200 is an embodiment of programmable control module 14 shown in, for example, FIG. 1. Controller system 200 includes a processor 202, a memory 204, a power system 206, inputs and outputs 208, and an actuator 210. Processor 202 is a low power microcontroller having discrete inputs and outputs for interacting with the other components of controller system 200. In this embodiment, processor 202 is an Atmel® AVR® ATtiny15L microcontroller that operates at low voltage and low power consumption. Processor 202 also includes on-board clock generation and on-board memory 204 in the form of RAM, FLASH, and EEPROM. Thus, external components are minimized.

In general, memory 204 includes both data memory and program memory for operating processor 202. At least a portion of the data memory is preferably stored in a non-volatile portion of memory such that the data may be restored through a power cycle and/or after power system 206 is disconnected. The uses of the non-volatile data memory are described in detail below with respect to FIGS. 21-29.

Power system 206 includes a charging port 212 and a voltage regulator 214. Power system 206 includes rechargeable batteries (e.g., nickel-cadmium, or lithium-ion, etc.). Further, it is advantageous to include the batteries in a "pack" arrangement so that easy replacement is possible. However, it is also advantageous to provide for the use of non-rechargeable batteries, such as alkaline batteries, in case recharging is not convenient. Alternatively, non-rechargeable batteries may provide for a higher charge-density allowing for longer runs. One such user of alkaline batteries is in critical situations where longer one-time-use is desired, such as in fishing tournaments. Additionally, regulator 214 is not necessary when the battery voltage is matched to the operating range of processor 202.

In this embodiment, charging port 212 provides an external power source for recharging of the batteries. The re-charging logic may be provided within power system 206, or may be controlled by processor 202. Charging port 212 is embodied as a standard "barrel plug" and includes a waterproof boot such that water will not penetrate the electrical components of controller system 200. Further, power system 206, specifically the batteries, may be enclosed in a separate water-tight area away from processor 202. This is advantageous where replacement of the batteries is desired, but the processor and other components of controller system 200 are not within the same water-tight area.

Inputs and outputs 208 provide for the programmability of controller system 200 and allow for feedback to the fisherman. In this embodiment, inputs and outputs 208 include an on/off pushbutton 220, a programming pushbutton 222, an on/off indicator 224, and a program indicator 226. Here, pushbuttons 220, 222 are waterproof SPST-type pushbuttons and may be exposed directly to the environment or may be covered by a waterproof plastic boot. Indicators 224, 226 are LED's, but may also be provided in other embodiments such as lamps or flash-type indicators. Pushbuttons 220, 222 and indicators 224, 226 are electrically connected to processor 202 and are, in general, controlled directly by processor 202 for reading inputs and activating outputs. The function of pushbuttons 220, 222 and indicators 224, 226 are explained below in detail with respect to FIGS. 21-29.

Actuator 210 may be embodied as a servo-mechanism, a motor, or as a linear or rotary solenoid. However, actuator 210 may be embodied as any mechanism capable of movement when commanded. In some embodiments, described in detail below, actuator 210 is a servo having a rotary output. Servo systems are known in the art and may include servos such as a standard FUTABA® S3004. Linear and rotary solenoids are also known in the art. Actuator 210 is operably connected to brake 50 and provides motion to selectively provide resistive force to planer board 40. In the embodiments described herein with respect to FIGS. 10A and 10B, actuator 210 selectively positions shutter 11. The operation of actuator 210 is described in detail with respect to FIGS. 10A and 10B.

Generally, the actuators discussed herein are referred to as electro-mechanical devices. Examples of such electro-mechanical devices are geared or direct-drive motors, linear solenoids (e.g., pull type or push/pull), latching solenoids, and rotary solenoids. However, other types of actuators are contemplated. For example, actuators can also be a non-electro-mechanical device. One type of actuator may be a geared system powered by the movement of the towed fishing body (e.g., a water-wheel powered mechanical system). Such mechanical systems may also include spring or coil powered (wind-up type) mechanical motion devices that would not require batteries. Alternatively, other actuators are possible, including combinations of the aforementioned types of actuators.

Figure 10A:
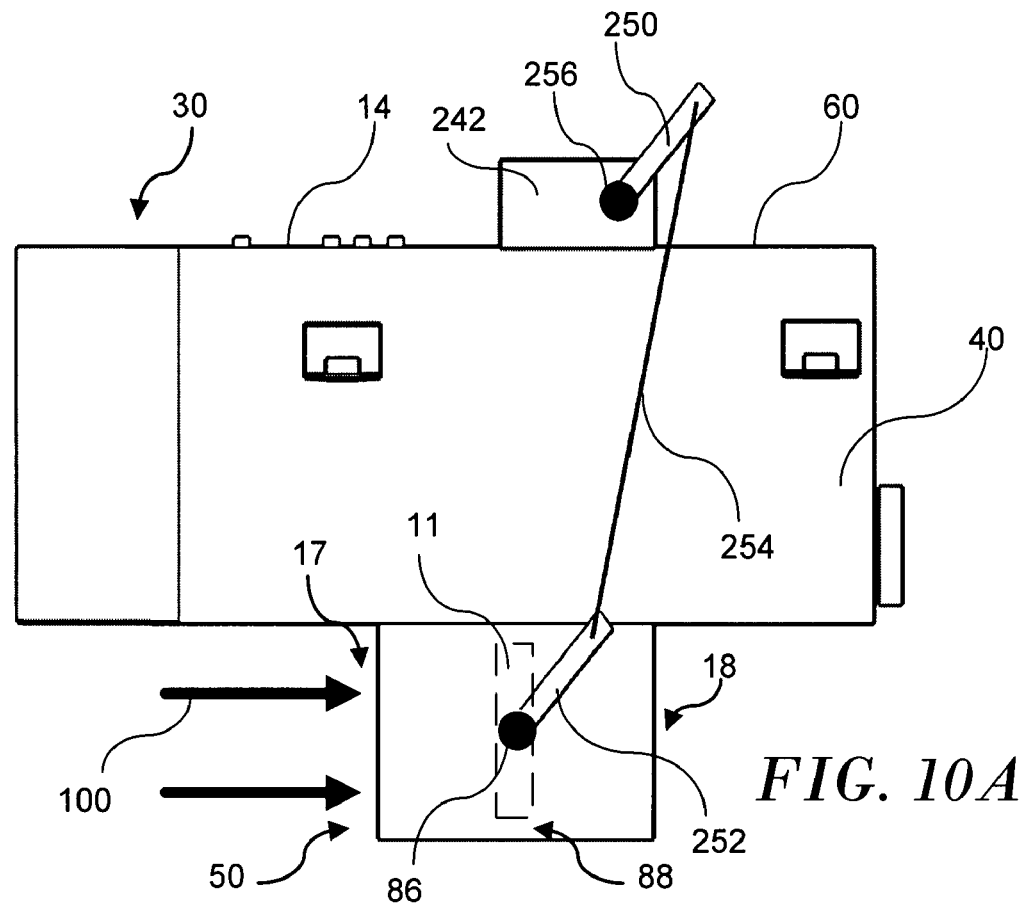
FIG. 10A is a side view of an embodiment of the trolling system of FIG. 3 where the brake is engaged.
Figure 10B:
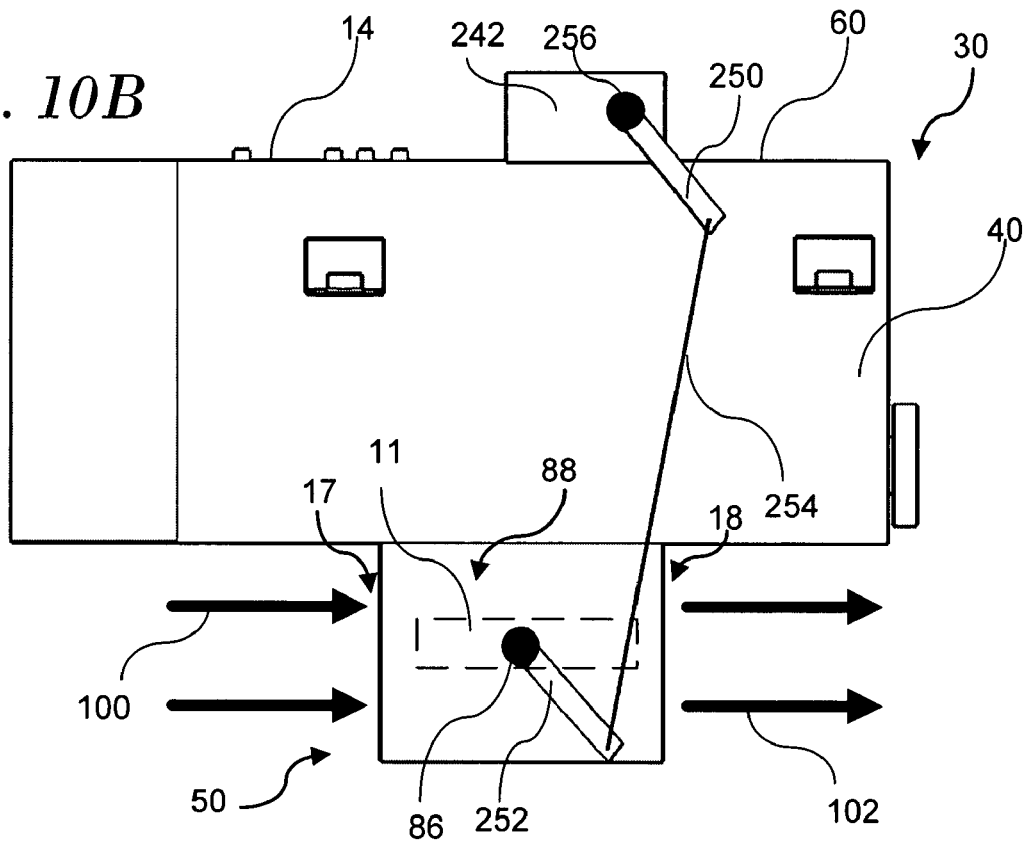
FIG. 10B is a side view of the embodiment of FIG. 10A where the brake is disengaged.

Turning now to FIGS. 10A and 10B, the operation of trolling system 30 is described in detail. A controller 240 and an actuator 242 are mounted to top side 60 of planer board 40 using screws, glue, or double-sided tape. Controller 240 is an embodiment of controller system 200 (shown in FIG. 9) and programmable control module 14 (for example, shown in FIG. 1). Mounting controller 240 and actuator 242 on top side 60 allows them to be substantially out of the water. Such an above water configuration is preferred where water-resistant housings are used rather than water-proof housings.

Power system 206 may be mounted anywhere on the board, and may be positioned to be balanced when trolling system 30 is in the water. To this end, the batteries (not shown) of power system 206 are mounted internally near the bottom side 62 of planer board 40 and further operate as ballast to maintain trolling system 30 upright in water (see also FIG. 11A detailed description).

Actuator 242 includes an actuator arm 250 connected to the motion system of actuator 242. Further, shutter 11 of brake 50 also has a shutter arm 252 that rotates shutter 11 along pivot point 86. Actuator arm 250 and shutter arm 252 are operably connected by a connecting link 254. Thus, when actuator 242 is commanded to move by controller 240, connecting link 254 moves shutter 11 via shutter arm 252. In this manner, when trolling system 30 is pulled through the water by line 26, the flow of water through brake 50 may be controlled.

In operation, controller 240 selectively positions shutter 11 of brake 50 to control water flow through brake 50. (See detailed description with respect to FIGS. 7A and 7B). As is illustrated in FIG. 10A, when brake 50 is engaged, shutter 11 is in a closed position and entering current 100 is not allowed to pass through housing 13 (e.g., entering current 100 enters housing 13 at inlet 17 but cannot exit at outlet 18). Thus, a resistive force, or drag, is introduced to planer board 40 by the force of entering current 100 against shutter 11 when pulled through water. Alternatively, controller 240 may command actuator 242 to disengage brake 50 and open shutter 11 such that water flow, e.g. entering current 100, is allowed to enter housing 13 at inlet 17 and exit at outlet 18 (exiting current 102). Thus, drag is minimized.

As is illustrated in FIGS. 10A and 10B, actuator arm 250 and shutter arm 252 are of similar lengths. However, arms 250, 252 may be of uneven lengths to maximize the force applied to shutter 11. Depending upon the speed of boat 22 (see FIG. 3) and the water current, a predetermined torque is necessary to open and close shutter 11. In cases where actuator 242 does not have enough direct torque to open and close shutter 11, a mechanical advantage may be employed (because of the gear-head motor in the servo) by making actuator arm 250 of a longer length. Additionally, the angles of rotation for actuator 242 may be adjusted using different length arms 250, 252. However, in the present embodiment, arms 250, 252 are of the same length. Thus, when actuator 242 turns ninety (90) degrees about an actuator pivot point 256, shutter 90 will also turn ninety (90) degrees about pivot point 86. (See FIGS. 10A and 10B).

Connecting link 254 is a length of stainless steel wire cut to a length approximately equal to the distance between actuator pivot point 256 and pivot point 86. The length is chosen to facilitate the rotation of shutter 11 with a ninety (90) degree rotation of actuator 242 where arms 250, 252 are of equal length. Further, connecting link 254 is configured having loops on both ends that connect with loops on arms 250, 252. However, alternative embodiments may have connecting link 254 rotably attaching to arms 250, 252 using ball joints or other connection configurations allowing for the movement of connecting link 254.

Figure 11A:
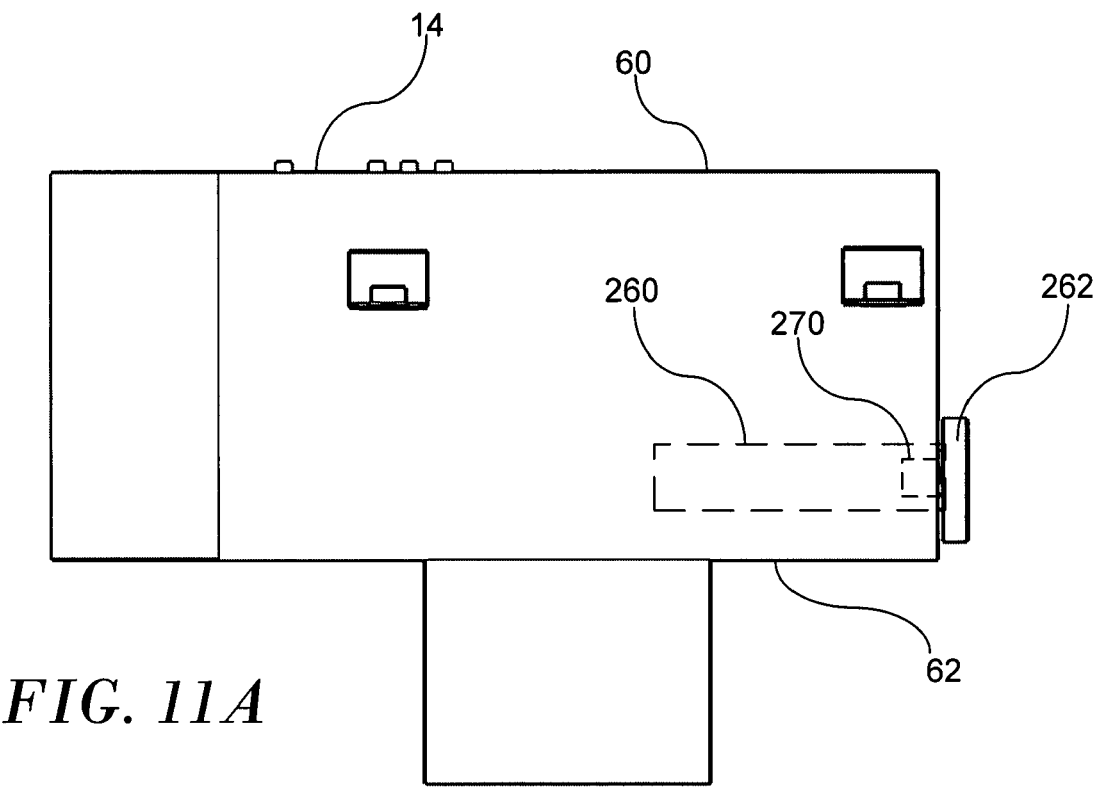
FIG. 11A is a side view of the embodiment of FIG. 10A including a battery compartment and a battery cover.

FIG. 11A illustrates a battery compartment 260 near bottom side 62 of planer board 40. Battery compartment 260 is sealed from water intrusion by a battery plug 262. Battery compartment 260 holds four (4) AA size batteries that connect in series and supply power to controller 11. Battery plug 262 is secured to planer board 40 by a threaded connection. Battery compartment 260 is shown near bottom side 62 of planer board 40 such that the mass of the batteries (not shown) contained within battery compartment 260 counteract the mass of controller 14 and actuator 242 on top side 60 of planer board 40. Thus, the balance of the mass maintains planer board 40 in an upright position in the water. However, as will be described in detail below, the placement of controller 14, actuator 242 and battery compartment 260 are not critical to the balancing of trolling system 30. This is because planer board 40 is configurable to include ballast (e.g., lead) and flotation (e.g., a floatation substance such as foam) at desired locations to ensure proper orientation in the water.

Figure 11B:
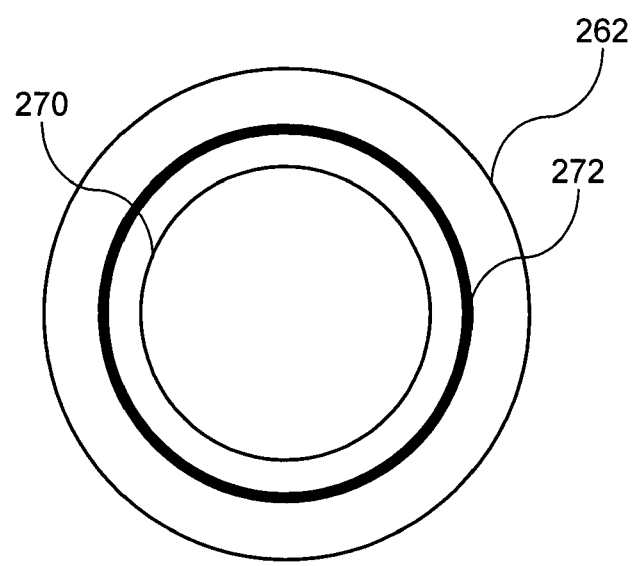
FIG. 11B is a top plan view of a battery plug.

FIG. 11B is a top plan view of battery plug 262 having a threaded portion 270 and an o-ring 272. Threaded portion 270 makes a connection with a threaded inner portion of battery compartment 260. This threaded connection holds battery plug 262 to planer board 40 as well as provides the force necessary to compress o-ring 272. In addition to the threaded connection, o-ring 272 provides a water-tight seal between battery compartment 260 and battery plug 262. To replace batteries, a user unscrews battery plug 262 and removes the batteries. Once the batteries are replaced, the user screws battery plug 262 with the necessary torque to optimally compress o-ring 272. Those skilled in the art will understand the use of a compression limiter to prevent over-tightening of o-ring 272.

Figure 12A:
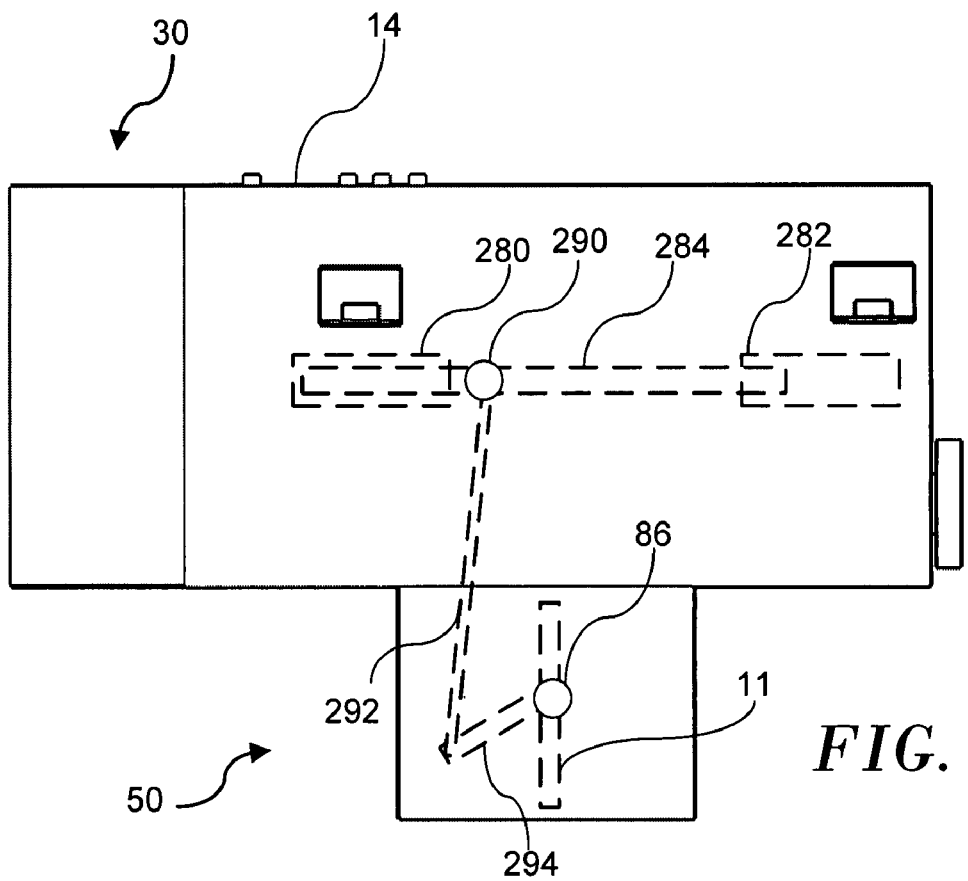
FIG. 12A is a side view of an alternative embodiment including a dual solenoids, where the brake is in a closed position.
Figure 12B:
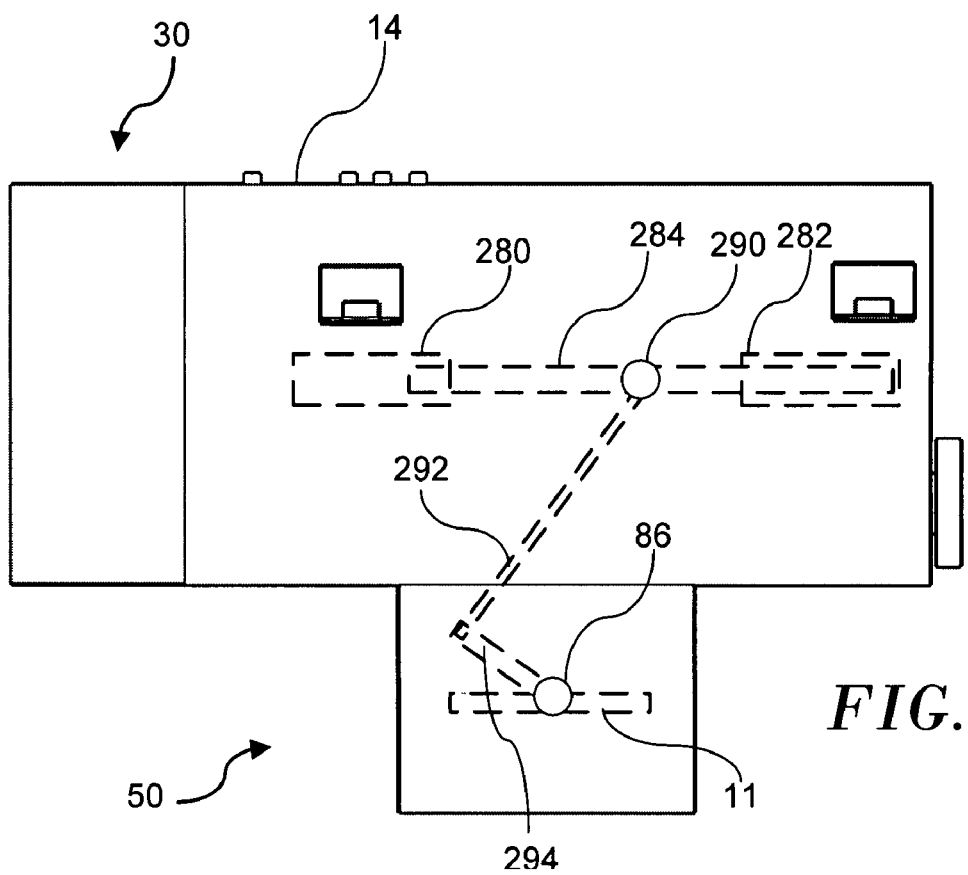
FIG. 12B is a side view of the embodiment of FIG. 12A where the brake is in an open position.

FIG. 12A is an embodiment of trolling system 30, including a first solenoid 280, a second solenoid 282, and a plunger 284. As discussed herein, plunger 284 and other components of solenoids and/or motors may be plastic coated to prevent corrosion that may interfere with the electrical or mechanical properties of the actuators. Plunger 284 further includes a pivot point 290 that connects to a linkage 292. Pivot point 290 allows linkage 292 to move with plunger 284 in a front position (illustrated in FIG. 12A) to a back position (illustrated in FIG. 12B). Linkage 292 connects to an arm 294 that rotates shutter 11 through pivot point 86. In this embodiment, control module 14 and the actuator (embodied as first solenoid 280, second solenoid 282, and plunger 284) are located within planer board 40. The advantages of such an arrangement include reduced susceptibility to damage from crush or impact. Additionally, the balance of trolling system 30 is improved without the use of ballast or additional floatation materials. Further, trolling system 30 is less likely to pick up foreign materials, such as weeds or branches, when pulled through the water because there are fewer acute angles on the exposed surface of planer board 40.

In operation, the selective movement of shutter 11 provides for the engagement and disengagement of brake 50 acting against the water flow proximal to brake 50. Control module 14 selectively energizes and de-energizes first solenoid 280 or second solenoid 282 to position plunger 284. When control module 14 desires to close shutter 11, first solenoid 280 is energized and second solenoid 282 is de-energized. Thus, plunger 284 will move toward and pass through first solenoid 280. (See FIG. 12A). When the opening motion of plunger 284 occurs, linkage 292 pushes shutter 11 closed by moving arm 294.

When control module 14 desires to open shutter 11, first solenoid 280 is de-energized and second solenoid 282 is energized. Thus, plunger 284 moves towards, and passes through, second solenoid 282. (See FIG. 12B). When the closing motion of plunger 284 occurs, linkage 292 pulls shutter 11 open by moving arm 294.

Alternate embodiments include the possibility to selectively command first solenoid 280 and second solenoid 282 such that an intermediate position of shutter 11 is achieved. Control module 14 commands first solenoid 280 and second solenoid 282 using a pulse width modulation scheme to selectively position plunger 284 at various distances between first solenoid 280 and second solenoid 282. Therefore, by controlling the position of plunger 284, a variable position of shutter 11 is achieved through the connection of linkage 292 and arm 294.

Figure 13A:
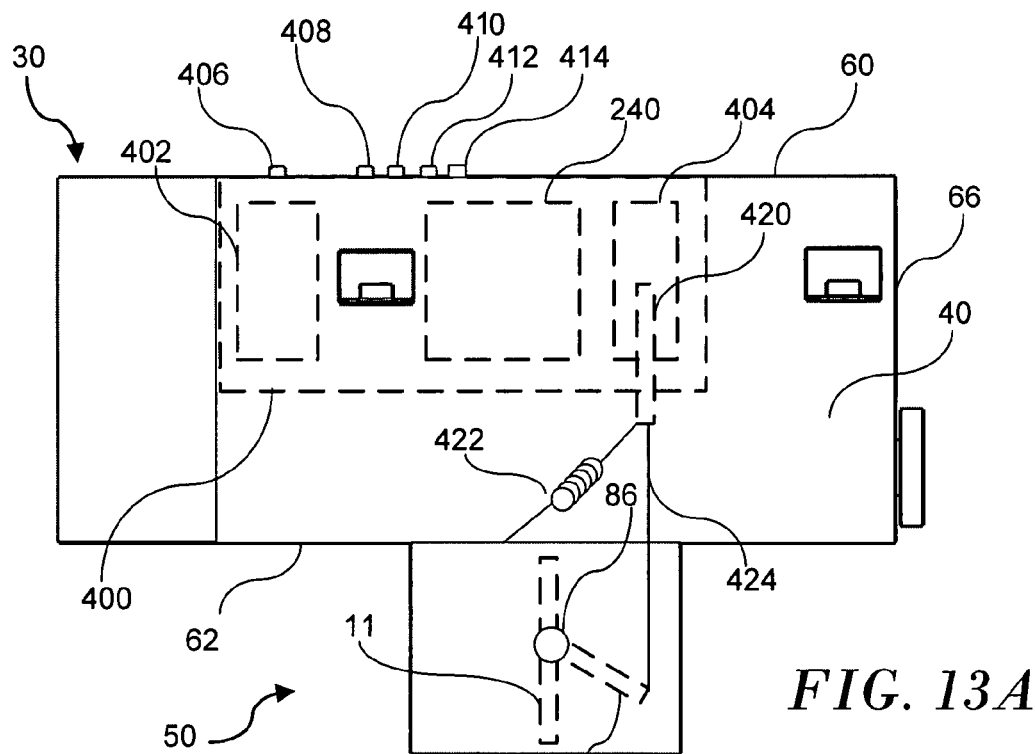
FIG. 13A is a side view of an alternative embodiment of the trolling system of FIG. 3, including a vertical solenoid and an internal mechanism, where the brake is engaged.
Figure 13B:
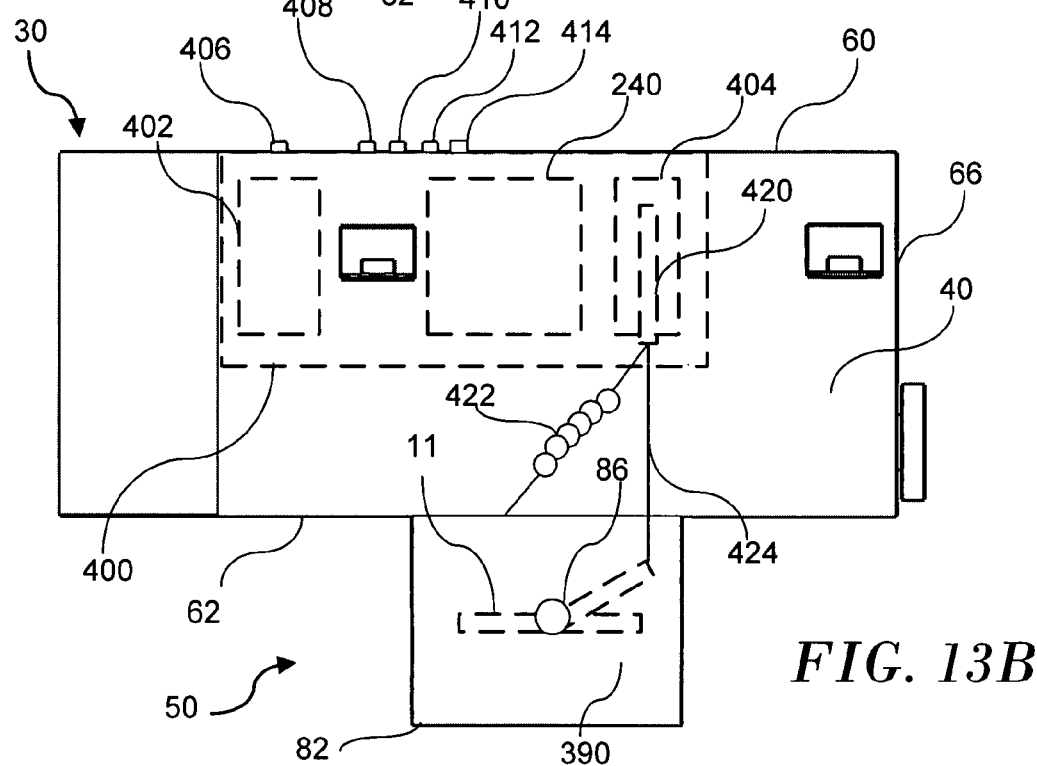
FIG. 13B is a side view of the embodiment of FIG. 13A where the brake is disengaged.

FIGS. 13A and 13B are side views of an embodiment of trolling system 30. Brake 50 is mounted to bottom side 62 of planer board 40 and includes shutter 11, housing 13, pivot points 86, 87, and an arm 390. A control module 400 is mounted near top side 60 of planer board 40 and is configured to be housed substantially within planer board 40. Control module 400 is a package containing a battery 402, controller 240, an actuator 404, a charging port 406, an on/off pushbutton 408, a programming pushbutton 410, a first indicator 412, and a second indicator 414.

Control module 400 is configured as a snap-in module that facilitates manufacturing and repair. Thus, control module 400 may be built separately from the mechanical components of trolling system 30 and installed as a single part during production. The attachment methods for control module 400 may include gluing, heat staking, screws, or "snaps" constructed into an injection molded planer board 40. Further, control module 400 contains sealed areas, such as controller 240 and battery 402, to avoid water intrusion and damage to sensitive components.

Charging port 406 is used to charge battery 402 when drained, or to top-off the charge when partially charged. Further, charging port 406 includes a water-tight closure that includes an o-ring to prevent water intrusion into control module 400. Charging port 406 includes a standard barrel-type receptacle that preferably receives a 9-14 volt input. The charging source preferably is provided from boat 22, a vehicle (e.g., a truck), or a wall charger for use in a home. The charging voltage level, the charging current level, and the specific embodiment of the receptacle may also be configured to receive charging systems as is known in the art. However, the charging voltage and current are matched to levels expected by the charging circuitry in control module 400.

Controller 240 (discussed in detail with respect to FIG. 9) is also provided with inputs and outputs electrically connected to on/off pushbutton 408, programming pushbutton 410, first indicator 412, and second indicator 414. Pushbuttons 408 and 410 are SPST switches that are waterproof for reliability. On/off pushbutton 408 turns control module 400 on and off. Programming pushbutton 410 determines the delay times for brake 50. First indicator 412 and second indicator 414 are LED's and are used to indicate the status of trolling system 30. First indicator 412, when lit, indicates that controller 240 is active and ready for operation. Second indicator 414 indicates the programming status of controller 240. The functions of the pushbuttons and indicators are described in detail below with respect to FIGS. 18-26.

Actuator 404 is a solenoid constructed of a winding used to create a magnetic field within an air core as those skilled in the art will appreciate. Preferably, the coil is designed for three (3) volt operation. The air core slidably receives a plunger 420 made of permeable metal. The steel or iron plunger 420 is attracted within the field generated by actuator 404 when energized. Actuator 404 is also configured as a latching-type solenoid such that when the stroke of plunger 420 is fully within the coil, plunger 420 latches in this position. Another stroke of plunger 420, provided through a momentary activation of the coil in actuator 404, unlatches plunger 420. The latching of plunger 420 may be by magnetic latching. A spring 422 then pulls plunger 420 partially out of the air core of actuator 404. An energizing pulse of actuator 404 then pulls plunger 420 back to a latched position.

To effectuate movement of shutter 11, plunger 420 is connected to arm 390 by a linkage 424. Linkage 424 is directly and rigidly connected to plunger 420 and moves linearly with the movement of plunger 420. Thus, as plunger 420 moves toward top side 60 of planer board 40, linkage 424 also moves linearly in the same direction. Additionally, as spring 422 pulls plunger 420 toward bottom side 62 (when plunger 420 is unlatched by a pulse from actuator 404), linkage 424 is also pulled linearly toward bottom side 62. By way of arm 390 that is connected to shutter 11, the opening and closing of shutter 11 is provided by the linear movement of plunger 420. By way of example, FIG. 13A shows shutter 11 of brake 50 in a closed position when plunger 420 is pulled to the maximum position towards bottom side 62 by spring 422. Alternatively, FIG. 13B shows shutter 11 in an open position when plunger 420 is pulled and latched toward top side 60 when actuator 404 is energized. When in the open position, plunger 420 is latched until another pulse to the solenoid of actuator 404 occurs.

FIGS. 13A and 13B show linkage 424 connecting plunger 420 to arm 390 within the body of planer board 40. Actuator 404, plunger 420, and linkage 424 are mounted substantially midway between inboard side 67 and outboard side 69. This arrangement provides for balance when planer board 40 rides through water. FIG. 13B illustrates shutter 11 in an open position. 13A illustrates shutter 11 in a closed position where plunger 420 is fully pulled within actuator 404 and latched. Thus, linkage 424 is also pulled towards top side 60 and arm 390 rotates shutter 11 to the closed position. FIG. 13B illustrates shutter 11 in an open position where plunger 420 is unlatched and is pulled towards bottom side 62 by spring 422 (shown in FIG. 13B). Thus, linkage 424 is also pulled towards bottom side 62 and arm 390 rotates shutter 11 to the open position. In FIGS. 13A and 13B, note that arm 390 is placed near back side 66 of planer board 40 relative to shutter 11. The rear mount allows for reduced "snagging" of water-born objects, such as plants (e.g., seaweed) and twigs, and also provides for self-clearing when shutter 11 is opened such that water flow therethrough will wash away a snagged object.

Figure 14:
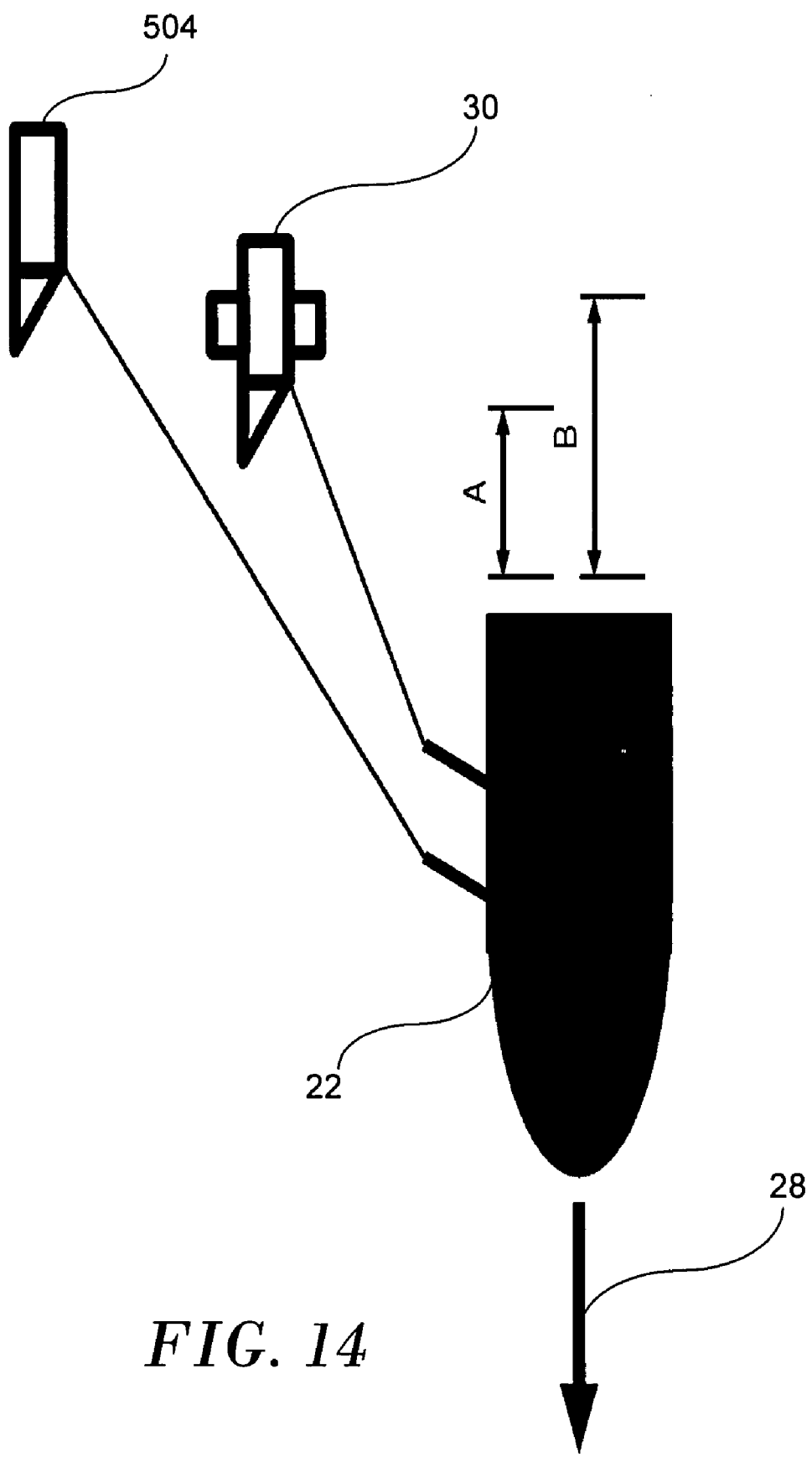
FIG. 14 is a top plan view of the trolling system of FIG. 3 and a standard planer board.

FIG. 14 is a top plan view of trolling system 30 and a standard planer board 504 when pulled by boat 22 in travel direction 28. In this scenario, trolling system 30 is not used with brake 50 being variably controlled (e.g., trolling system 30 is turned off). When trolling system 30 is disabled, brake 50 may be disengaged (if not already so arranged) so that trolling system 30 behaves similarly to standard planer board 504. Standard planer board 504 maintains a distance B when pulled through water. Trolling system 30, when brake 50 is continuously disengaged, maintains a distance A when pulled through water.

Figure 15A:
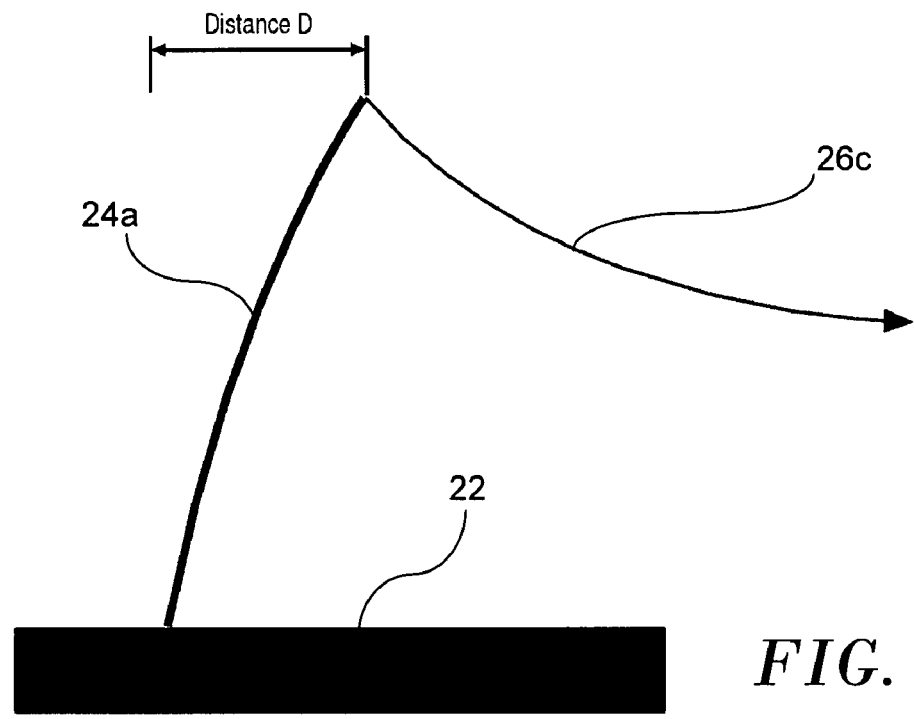
FIG. 15A is a side view of a rod and line for use with the trolling system of FIG. 3, the rod and line in an un-tensioned state.
Figure 15B:
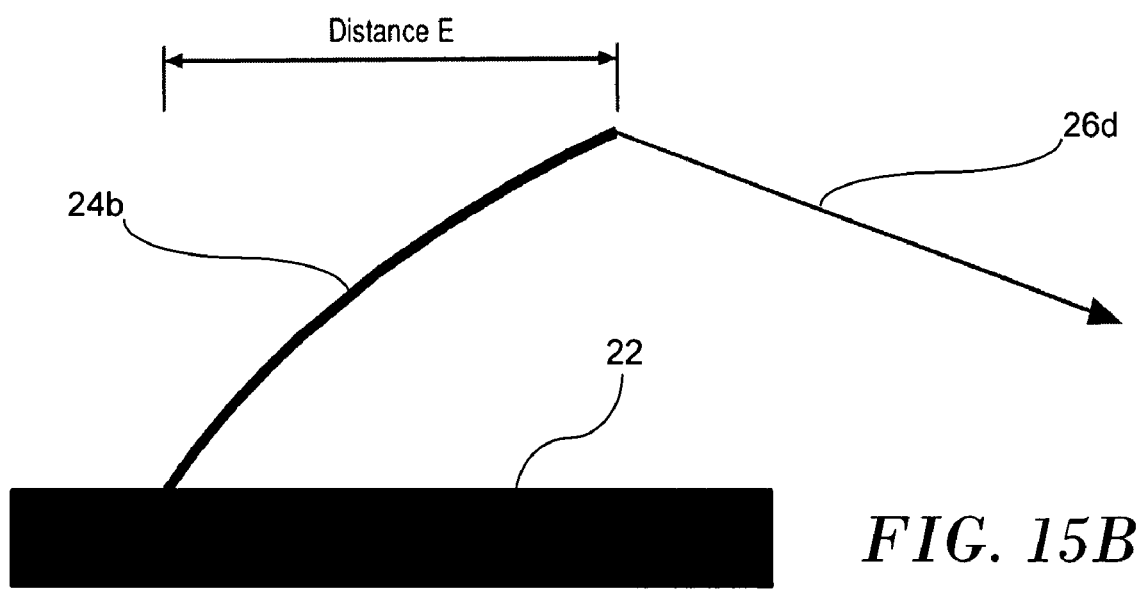
FIG. 15B is a side view of a rod and line for use with the trolling system of FIG. 3, the rod and line in a tensioned state.

FIGS. 15A and 15B illustrate the effects upon an un-flexed rod 24a, an un-tensioned line 26c, a flexed rod 24b, and a tensioned line 26d. When brake 50 is disengaged (e.g., shutter 11 is in an open position to provide low resistance), the drag upon trolling system 30 is minimal. Therefore, there is a reduced, or normal, force from planer board 40 in the water pulling on un-flexed rod 24a. Due to the reduced force required to pull trolling system 30, un-tensioned line 26c is in a normal state of tension. Further, un-flexed rod 24a is also in a normal state where there is a reduced stress on un-flexed rod 24a to pull trolling system 30 through the water.

However, when brake 50 is engaged, (e.g., shutter 11 is in a closed position to provide a high resistive force), significant additional force is required to pull trolling system 30 through the water. Thus, tensioned line 26d is in a high-tension state and flexed rod 24b is under strain to pull trolling system 30 through the water.

In FIG. 15A, a distance D illustrates an un-flexed distance between the attachment point of rod 24 of boat 22 to the tip of rod 24. Additionally, un-tensioned line 26c may exhibit line droop and is generally not under high-tension. FIG. 15B illustrates a flexed distance E where a greater tension is placed on flexed rod 24b due to the engagement of brake 50. Thus, the difference of un-flexed distance D and flexed distance E must require that trolling system 30 is at a greater distance behind boat 22 when brake 50 is engaged. Moreover, at least during the transition periods of rod-flex, the speed of trolling system is controlled by brake 50. Further, the slack of line 26 is taken up, and also line 26 is stretched, providing that trolling system 30 is at a greater distance behind boat 22 when brake 50 is engaged.

Figure 16:
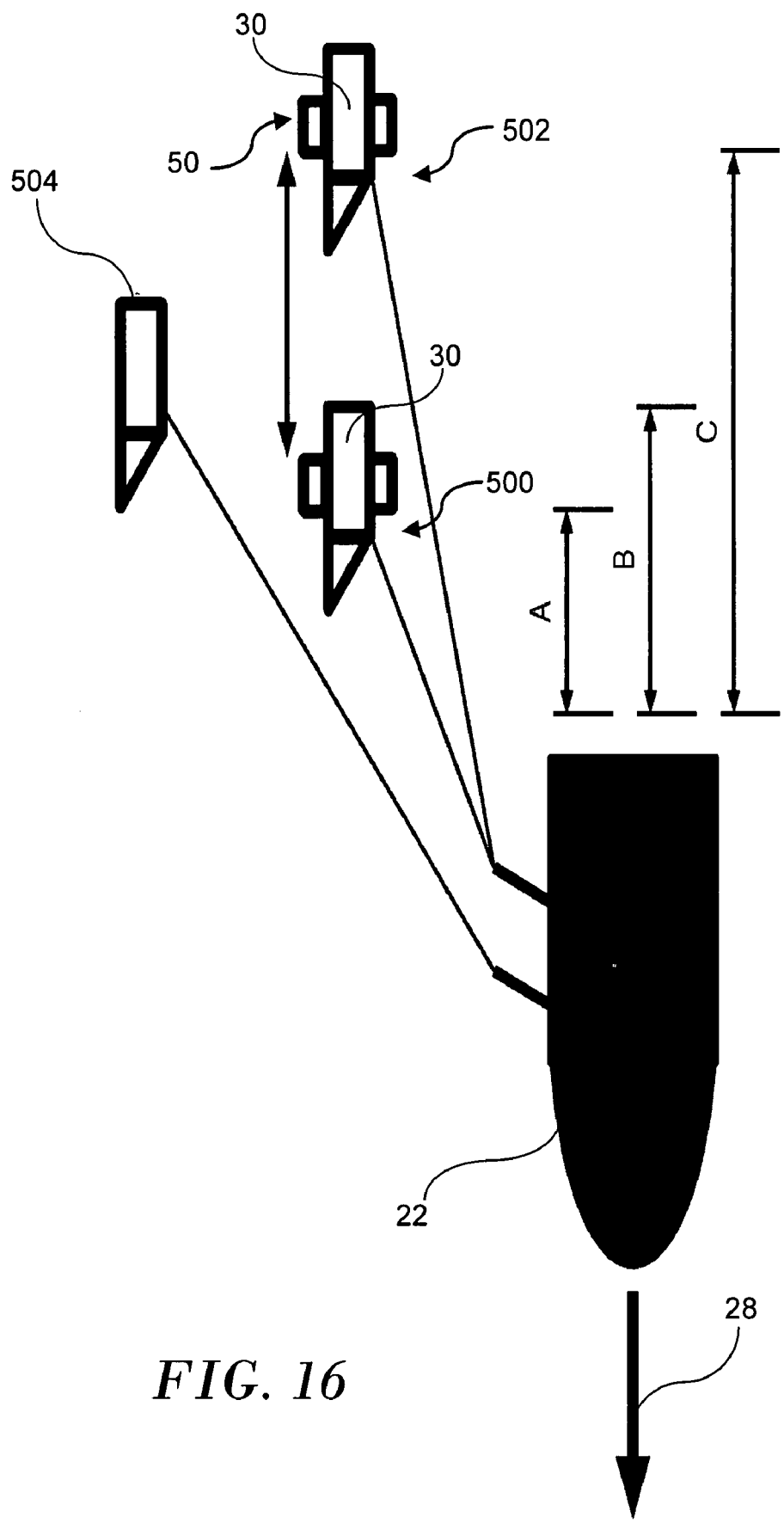
FIG. 16 is a top plan view of the trolling system of FIG. 3 demonstrating the effect of the brake to the planer board.

FIG. 16 shows the variable positioning of trolling system 30. Boat 22 pulls trolling system 30 in travel direction 28. A first position 500 and a second position 502 are shown for trolling system 30. Boat 22 also pulls standard planer board 504 for relative comparison. When brake 50 is disengaged (e.g., in a reduced drag configuration) trolling system 30 is at first position 500 and is a distance A behind boat 22. When brake 50 is engaged (e.g., in a high drag configuration), trolling system 30 is at second position 502 and is a distance C behind boat 22. Standard planer board 504 is at a constant distance B behind boat 22 and is, in this example, between first position 500 and second position 502.

Variable positioning of trolling system 30 is accomplished through the selective introduction of a resistive force, or drag, using brake 50. To this end, controller 240 moves actuator 242 to disengage or engage brake 50 in a reduced drag or increased drag configuration respectively. As shown in FIG. 15A, when brake 50 is disengaged (e.g., in a reduced drag configuration) un-flexed rod 24a and un-tensioned line 26c provide that trolling system 30 is closer to boat 22 as shown by first position 500 and distance A. FIG. 15B shows the flexed rod 24b and tensioned line 26d when brake 50 is in a high drag configuration. Thus, trolling system 30 is at second position 502 and is a distance C behind boat 22. When brake 50 is periodically transitioned from a reduced drag configuration to a high drag configuration (e.g., brake 50 is periodically disengaged and engaged), trolling system 30 moves between first position 500 and second position 502, relative to boat 22. Therefore, trolling system 30 is selectively positioned at distances A and C behind boat 22. Moreover, the speed of trolling system 30 is also controlled during the transitions between distances A and C.

Controller 14, in an embodiment, is configured to periodically position brake 50 in a low drag configuration and a high drag configuration to effectuate the variable positioning of trolling system 30. By selectively introducing drag to trolling system 30, the speed and position of trolling system 30 and lure 36 is controlled by controller 14. At first position 500, trolling system 30 is generally operating at the same speed as boat 22. However, when brake 50 is in a high drag configuration, the speed of trolling system 30 is slowed such that trolling system 30 moves from position A to position C behind boat 22. Likewise, when brake 50 is disengaged to a low drag position, trolling system 30 speeds up and achieves position A from position C.

For each distance A and C, a delay time (or dwell time) is programmable for controller 14 such that the positioning and/or periodicity of the trolling system 30 is controllable. Further, in circumstances such as when significant waves are present in the water, trolling system 30 may not require variable speed and positioning (due to wave action on planer board 40). Thus, controller 14 may be turned off and trolling system 30 may be used as a standard planer board.

Figure 17A:
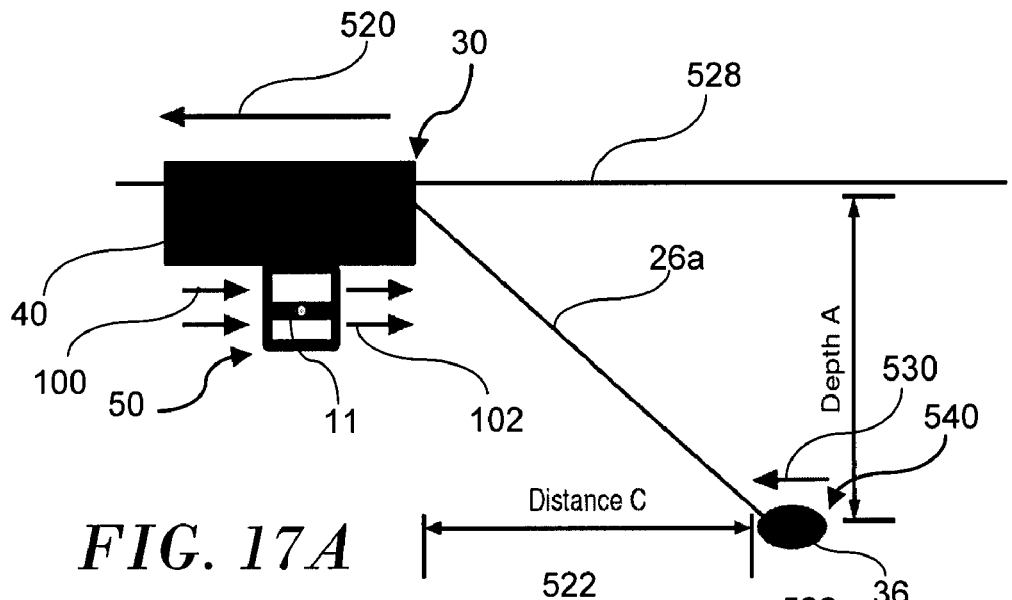
FIG. 17A is a side view of the trolling system of FIG. 3, the planer board being pulled through the water and towing the lure, where the brake is disengaged.
Figure 17B:
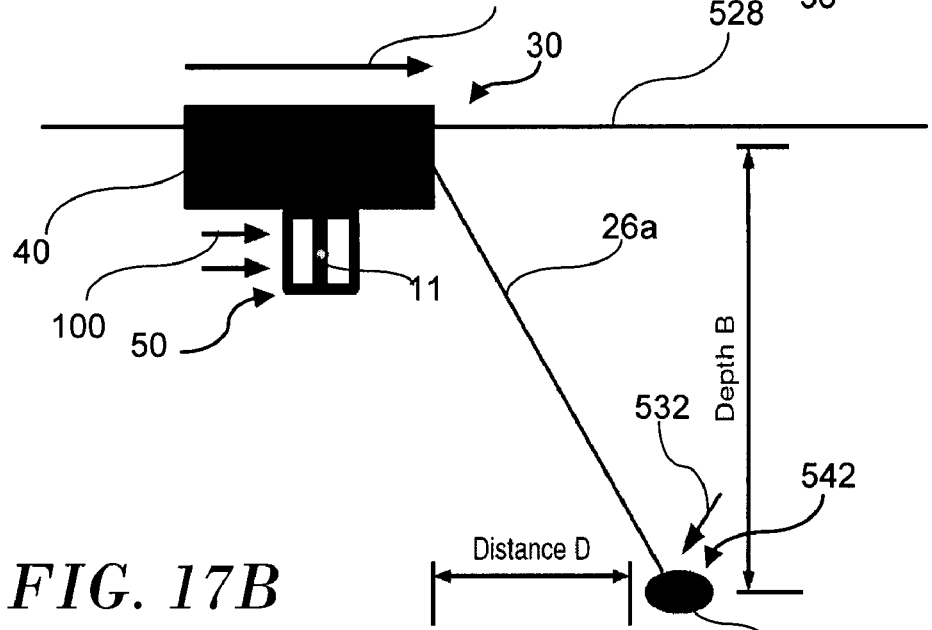
FIG. 17B is a side view of the trolling system of FIG. 3, the planer board being pulled through the water and towing the lure, where the brake is engaged.
Figure 17C:
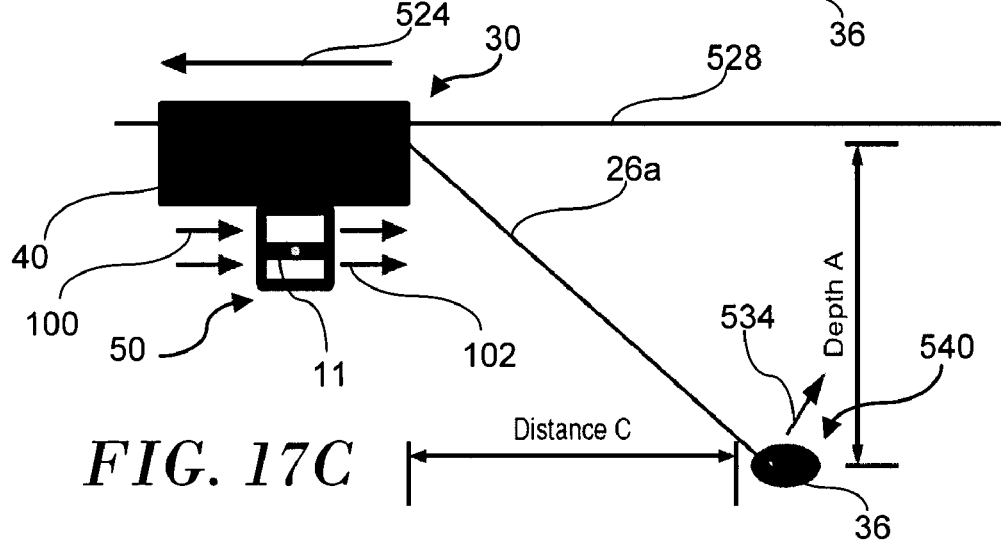
FIG. 17C is a side view of the trolling system of FIG. 3, the planer board being pulled through the water and towing the lure, where the brake transitions from an engaged state to a disengaged state.

FIGS. 17A-17C show the effects of variable speed and variable positioning of trolling system 30 on the positioning of lure 36 in the water. A portion of planer board 40 is above a surface 528 of water. A portion of planer board 40, including brake 50, is below surface 528. FIG. 17A illustrates trolling system 30 pulled through water at a steady state with brake 50 in a reduced drag configuration. Entering current 100 is generated by a pulling motion 520 of trolling system 30 through the water. In a reduced drag configuration, entering current 100 is allowed to pass through brake 50 allowing exit current 102 to flow out the back. In this state, lure 36 is positioned a distance C behind trolling system 30 and a depth A below surface 528. In this configuration, lure 36 moves at a constant speed 530 and is at a first position 540.

Now turning to FIG. 17B, when brake 50 is in an increased drag configuration, entering current 100 is blocked by shutter 11 in brake 50. Flexed rod 24b now allows trolling system 30 to move more rearward of boat 22 by at least the difference of distances D and E. Including line tension (the difference between un-tensioned line 26c and tensioned line 26d), the distance of trolling system 30 behind boat 22 is increased. As a result of the introduced restive force (e.g. drag), trolling system 30 decelerates along vector 522. Thus, the mass of lure 36 drops in the water and positions lure 36 a closer distance D from planer board 40. Further, due to the repositioning, lure 36 is at a second position 542 having a deeper depth B under surface 528. The motion from the position of lure 36 in FIG. 17A to the position in FIG. 17B is illustrated by vector 532.

Turning now to FIG. 17C, brake 50 is configured for low drag and entering current 100 is allowed to pass through brake 50. Thus, trolling system 30 accelerates along vector 524 and speeds up to substantially the same speed as boat 22. Rod 24 is in an un-flexed position 24a and un-tensioned line 26c allows for closer positioning of trolling system 30 to boat 22. The position of lure 36 now transitions along vector 534 back to the steady state first position 540 at distance C behind trolling system 30 and depth A below surface 528. The actual distance for first position 540 and second position 542 behind trolling system 30 and depth below surface 528 is determined by several factors, including the length of leader 26a and the properties of lure 36 itself (such as drag and buoyancy).

By periodically configuring brake 50 for reduced drag and high drag, the speed and position of trolling system 30 is controlled. Further, through the programmability of controller 240, the timing and distance is controllable. Indeed, where controller 240 and actuator 242 provide for intermediate positioning, any position between first position 500 and second position 502 is achievable. In general operation, trolling system 30 provides selective positioning and/or periodic positioning of lure 36.

The selective acceleration and deceleration and selective positioning from first position 540 to second position 542 provides for the realistic "action" of lure 36 in the water. It is known in the art of fishing that a lure having "action" is more likely to entice a fish to strike, and therefore, more fish are caught. By including the aspect of variable speed control and variable positioning in trolling system 30, a trolling setup is provided that allows boat 22 to continue at a steady state through the water while still providing "action" to the lures. This allows for the fisherman to concentrate on other activities, as well as reduces wear and tear on the components of boat 22. Further, the programmable features of trolling system 30 allow for precise and repeatable action of lure 36.

Figure 18:
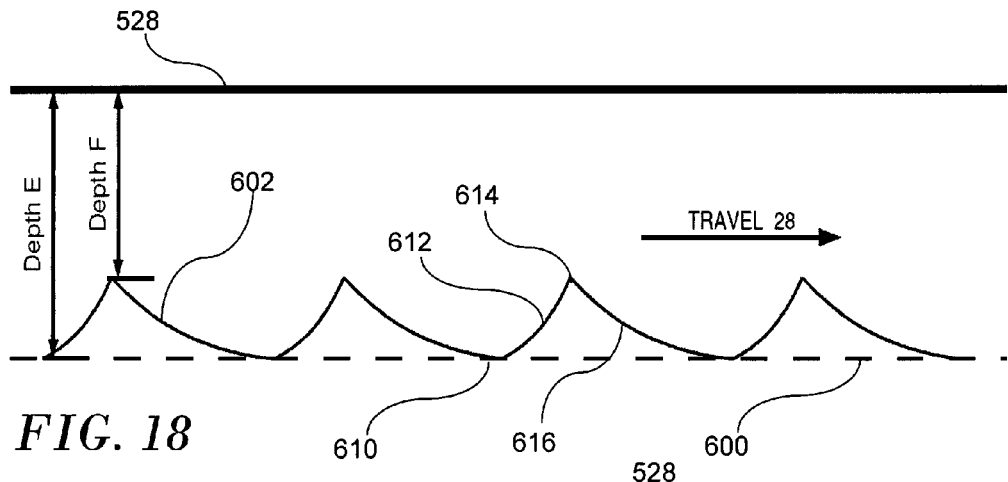
FIG. 18 is a side view and depth chart of a floating crankbait style lure as pulled by the trolling system of FIG. 3 and alternatively as pulled by a standard planer board.

FIG. 18 is a side view and depth chart of a floating crank-bait style lure as pulled by trolling system 30 and alternatively, as pulled by standard planer board 504. Trolling system 30, standard planer board 504, and the lure are pulled by boat 22 in travel direction 28 at a constant speed and direction. Under these conditions, standard planer board 504 pulls the lure at a constant depth E under water 528, the path of which is described by a constant depth line 600. The properties of the floating crank-bait style lure determine depth E and generally include lure style, mass, buoyancy, length of line set-back (embodied as the length of leader 26a), line 26 diameter, and the trolling speed. Indeed, as is illustrated by constant depth line 600, the depth of the lure (determined primarily due to the length of leader 26a) does not change in speed or depth when pulled by standard planer board 504. Thus, no action is imparted to the lure.

When pulled through the water by trolling system 30, an action is imparted to the lure as shown by a varying depth line 602. Brake 50 is closed at a first time 610 and the lure begins to slow down and rise in the water as illustrated by an upward motion 612 to a depth F. This action is imparted to the lure because there is reduced pulling force provided by trolling system 30 when brake 50 is closed. Due to the nature of floating crank-bait style lure, the inherent buoyancy of the lure provides that the lure will rise in the water when less pulling force is applied. At a predetermined time, brake 50 opens at a second time 614. The lure then has increased pulling force applied by trolling system 30. The lure then darts forward and down to depth E in a downward motion 616 based on the characteristics of the lure and the setup (described above). As can be seen by varying depth line 602, the nature of trolling system 30 provides for a periodic action of the lure at depths E and F under surface 528 of the water.

Figure 19:
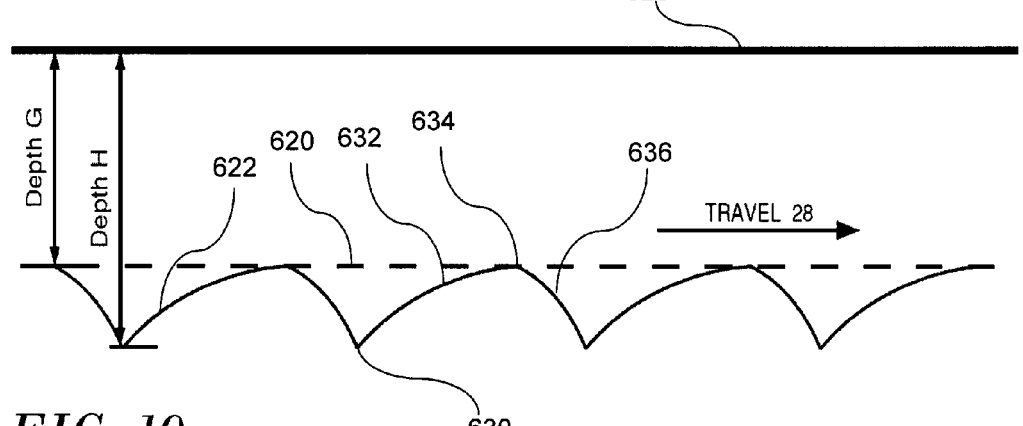
FIG. 19 is a side view and depth chart of a sinking body bait style lure as pulled by the trolling system of FIG. 3 and alternatively as pulled by a standard planer board.

FIG. 19 is a side view and depth chart of a sinking-body-bait-style lure as pulled by trolling system 30 and alternatively as pulled by standard planer board 504. Trolling system 30, standard planer board 504, and the lure are pulled by boat 22 in travel direction 28 at a constant speed and direction. Under these conditions, standard planer board 504 pulls the lure at a constant depth G under water 528, the path of which is described by constant depth line 600. The properties of the sinking-body-bait-style lure determine depth G and generally include lure style, mass, buoyancy, length of line set-back (embodied as the length of leader 26a), line 26 diameter, and the trolling speed. Indeed, as is illustrated by a constant depth line 620, the depth of the lure does not change in speed or depth when pulled by standard planer board 504. Thus, no action is imparted to the lure.

When pulled through the water by trolling system 30, an action is imparted to the lure as shown by a varying depth line 622. Brake 50 is opened at a first time 630 and the lure darts forward and upward in the water as illustrated by an upward motion 632 to depth G. This action is imparted to the lure because there is increased pulling force provided by trolling system 30 when brake 50 is opened. Due to the nature of the sinking-body-bait-style lure, the mass (and lack of buoyancy) causes the lure to fall in the water when reduced pulling force is applied and rise up when increased pulling force is applied. At a predetermined time, brake 50 closes at a second time 634. The lure then has reduced pulling force applied by trolling system 30. The lure then slows and drops in the water to depth H in a downward motion 636 based on the characteristics of the lure and the setup (described above). As can be seen by varying depth line 622, the nature of trolling system 30 provides for a periodic action of the lure at depths G and H under surface 528 of the water.

Figure 20:
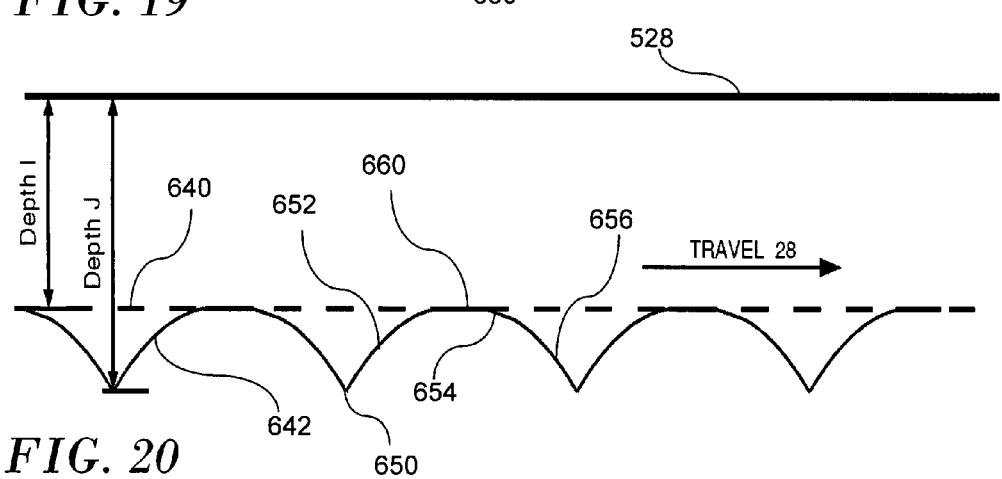
FIG. 20 is a side view and depth chart of a crawler harness with a snap weight type lure as pulled by the trolling system of FIG. 3 and alternatively as pulled by a standard planer board.

FIG. 20 is a side view and depth chart of a crawler-harness-with-a-snap-weight-type lure as pulled by trolling system 30 and alternatively, as pulled by standard planer board 504. Trolling system 30, standard planer board 504, and the lure are pulled by boat 22 in travel direction 28 at a constant speed and direction. Under these conditions, standard planer board 504 pulls the lure at a constant depth I under water 528, the path of which is described by a constant depth line 640. The properties of the crawler-harness-with-a-snap-weight-type lure determine depth I and generally include lure style, mass, buoyancy, length of line set-back (embodied as the length of leader 26a), line 26 diameter, and the trolling speed. Indeed, as is illustrated by constant depth line 640, the depth of the lure does not change in speed or depth when pulled by standard planer board 504. Thus, no action is imparted to the lure.

When pulled through the water by trolling system 30, an action is imparted to the lure as shown by a varying depth line 642. Brake 50 is opened at a first time 650 and the lure darts forward and upward in the water as illustrated by an upward motion 652 to depth I. This action is imparted to the lure because there is increased pulling force provided by trolling system 30 when brake 50 is opened. Due to the nature of the crawler-harness-with-a-snap-weight-type lure, the mass causes the lure to rise up when increased pulling force is applied and fall in the water when reduced pulling force is applied. At a predetermined time, brake 50 closes at a second time 654. The lure then has reduced pulling force applied by trolling system 30. The lure then slows and drops in the water to depth J in a downward motion 656 based on the characteristics of the lure and the setup (described above). As can be seen by varying depth line 642, the nature of trolling system 30 provides for a periodic action of the lure at depths I and J under surface 528 of the water.

In this illustrative example, a longer time between first time 650 and second time 654 allows for the lure to maintain depth I for a dwell period 660 before further action is imparted by trolling system 30. Thus, the timing of opening and closing of brake 50 may be programmed for fast action, slow action, and further provides for variable and programmable depths of the lure. Where brake 50 is programmed to open and close before depths I and J are achieved by the lure, trolling system 30 controls variable depth between the normal depths I and J as determined by the setup alone.

Figures 21, 22:
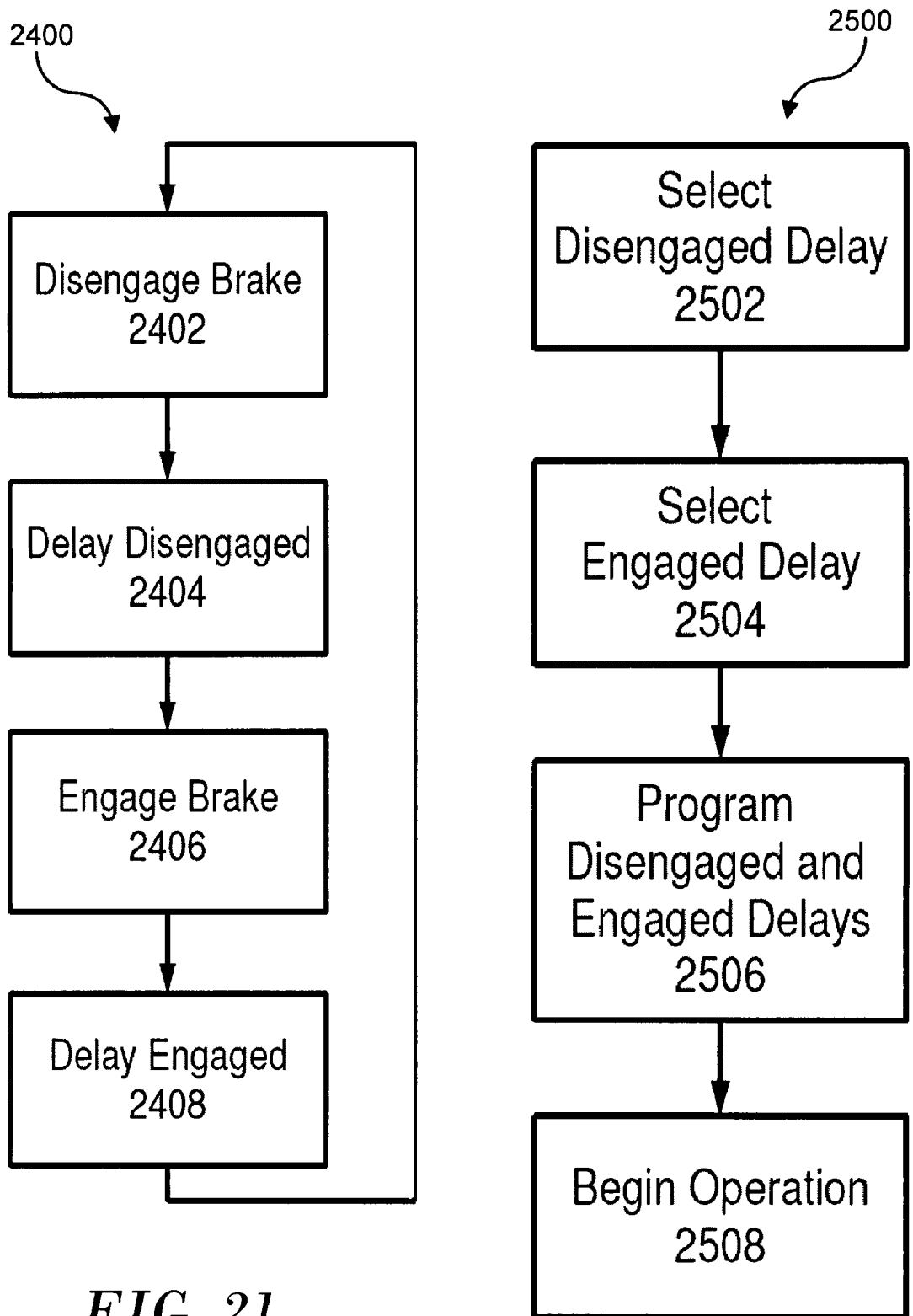
FIG. 21 is a flow diagram of the operation of the brake for the trolling system of FIG. 3.
FIG. 22 is a flow diagram of the selection of variable timing of the brake for the trolling system of FIG. 3.

FIG. 21 is a flow diagram of the operation of the brake for the trolling system of FIG. 3. A control process 2400 begins at step 2402 where brake 50 is disengaged. This allows for trolling system 30 to move forward in travel direction 28 with a minimum of resistance.

Next, at step 2404, an open delay is performed while brake 50 is disengaged, allowing for planer board 40 to accelerate in travel direction 28. Lure 36 also accelerates as the pulling force is increased. The delay is variable and programmable. Thus, planer board 40 may be allowed to accelerate to a steady state speed the same as boat 22, or may be allowed to accelerate only a portion of time before planer board 40 attains the speed of boat 22.

Next, at step 2406, brake 50 is engaged. At this time, planer board 40 decelerates and increased tension is applied to line 26 and rod 24 bends to a flexed position for flexed rod 24*b*.

Next, at step 2408, a closed delay is performed while brake 50 is closed, allowing for planer board 40 to decelerate. Lure 36 also decelerates as the pulling force is decreased. The process then repeats as control proceeds to step 2402.

In general, the action imparted to lure 36 based on control process 2400 is described in detail with respect to FIGS. 18-20. The motion imparted to planer board 40 is described in detail with respect to FIGS. 16-17C. Additionally, the mechanics of rod 24 and line 26 are described in detail with respect to FIGS. 15A and 15B. In this way, the speed and position of planer board 40 and the speed and depth of lure 36 are controlled.

FIG. 22 is a flow diagram of the selection of variable timing of the brake for the trolling system of FIG. 3. A delay selection process 2500 begins at step 2502 where a fisherman selects a delay time for the open position of brake 50.

Next, at step 2504, the fisherman selects a delay time for the closed position of brake 50.

Next, at step 2506, the fisherman loads the selected delay times to controller system 200.

Next, at step 2508, trolling system 30 begins operation as described in detail with respect to control process 2400, which is described in detail with respect to FIG. 21.

Selection of delay times and the loading of the delay times are performed through inputs/outputs 208 via on/off pushbutton 408 and programming pushbutton 410, which is described in detail with respect to FIGS. 9 and 13A. Additionally, feedback for the selected delays and the loading of the delays are provided by first indicator 412 and second indicator 414 as a positive indication that the selection and programming functions were successful. Absent a fisherman's input, controller system 200 may automatically configure delay times based on known delays providing a high probability of success for average trolling speeds and lure 36 types.

FIG. 23 is a flow diagram of the stored operation 2600 of the brake using stored parameters for the trolling system of FIG. 3. On power-up, controller system 200 begins operation by reading saved delay programs from memory 204 at step 2602.

Next, at step 2604, a fisherman may select a stored program using on/off pushbutton 408 and programming pushbutton 410 described in detail with respect to FIGS. 9 and 13A.

Next, at step 2606, controller system 200 programs the selected open and closed delays.

Next, at step 2608, trolling system 30 begins operation as described in detail with respect to control process 2400, which is described in detail with respect to FIG. 21.

The saved programs may include open and close delays known to be good for the region, or fishing conditions presented to the fisherman. For example, if the fisherman were at the same location the day earlier and experimentally determined the optimum open and closed delays, these delays will likely perform similarly under the current conditions. However, if conditions have changed slightly, the previous days' settings at least provide a starting point for the fisherman. After determining the success of the prior days' delays, the fisherman may adjust the delays to further refine the action of lure 36.

FIG. 24 is a flow diagram of the operation of water parameter configuration 2700 for the trolling system of FIG. 3. At step 2702, the current water parameters are determined. This step may involve a fisherman collecting information from local weather services (i.e., water temperature, barometric pressure, etc.) as well as on-site information such as water temperature, salinity, pH, cloudiness, etc. Additionally, controller system 200 may include sensors for these conditions that allows for automatic detection of the water conditions.

At step 2704, the fisherman may then consult a chart that includes information compiled regarding the programming of open and closed delays for these specific conditions. Further, given the automatic data collection of controller system 200, a program may automatically be selected for the given water conditions.

At step 2706, the open and closed delays are programmed to trolling system 30 by the fisherman, or automatically by controller system 200.

At step 2708, trolling system 30 begins operation as described in detail with respect to control process 2400, which is described in detail with respect to FIG. 21.

Figure 25:
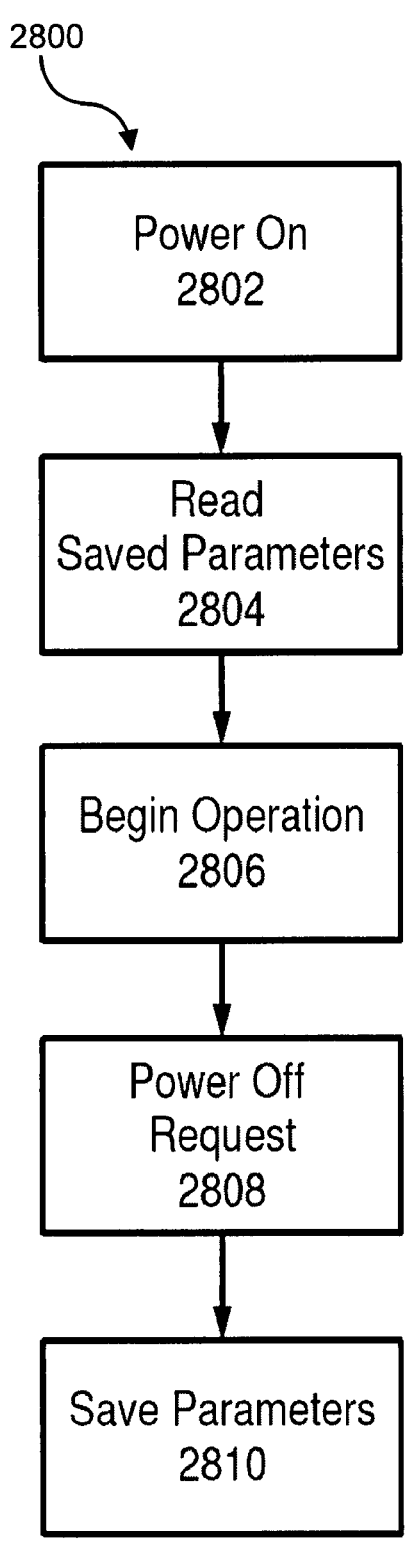
FIG. 25 is a flow diagram of the saved parameter feature of the brake for the trolling system of FIG. 3.

FIG. 25 is a flow diagram of the saved parameter feature 2800 of the brake for the trolling system of FIG. 3. At step 2802, controller system 200 powers on.

Next, at step 2804, saved parameters are loaded from memory 204. The saved parameters may include the delay times for engagement and disengagement of brake 50. The saves parameters may also include predetermined profiles for the time delays for brake 50. Moreover, the last programmed parameters that were saved may be loaded. Alternatively, selection of a fisherman's favorite settings may be loaded.

Next, at step 2806, trolling system 30 begins operation as described in detail with respect to control process 2400, which is described in detail with respect to FIG. 21.

Next, at step 2808, a request for powering off is determined by controller system 200. The request for powering off may come from on/off pushbutton 408 made by the fisherman when the trolling sequence is complete. Additionally, a request for powering off may be determined by controller system 200 itself under fault conditions or when power system 206 is deemed to be in a low-power state (e.g., the battery is too low to continue operation).

Next, at step 2810, controller system 200 saves the open and closed delays to memory 204. Such a saving operation is performed by saving the delay parameters, and statistical information, if available, to a non-volatile memory such as an EEPROM or to FLASH memory.

Figure 26:
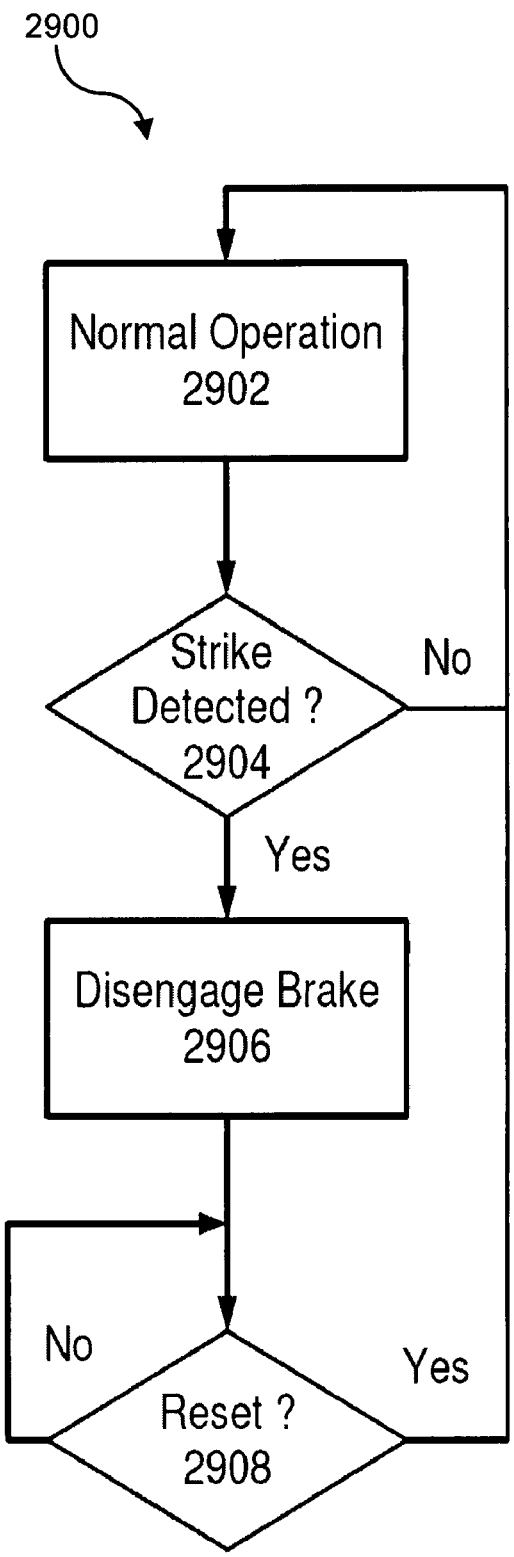
FIG. 26 is a flow diagram of the selective positioning of the brake having a strike detector for the trolling system of FIG. 3.

FIG. 26 is a flow diagram of the selective positioning 2900 of the brake having a strike detector for the trolling system of FIG. 3. In step 2902, trolling system 30 is performing under normal operation as described in detail with respect to control process 2400, which is described in detail with respect to FIG. 21.

Next, in step 2904, controller system 200 determines if a strike has been detected. Strike detection may be provided by a strain gauge attached to leader 26*a* and provides controller system 200 with an indication if a significant force is applied to lure 36. This allows controller system 200 to infer whether a fish is on. Additionally, a spring may be used in-line with leader 26a with a magnet attached thereto. When a fish is on, the spring will be stretched and the magnet will move to a position detectable by a hall-effect device that indicates a strike. In either case, if controller system 200 does not detect a strike, control proceeds to step 2902. If a strike is detected, control proceeds to step 2906.

In step 2906, having detected a strike, controller system 200 opens brake 50 such that the fisherman will have less resistance when pulling in the fish. If brake 50 were closed, or remains in normal operation, resistive force (drag) is increased which will make reeling in the fish more difficult for the fisherman. Additionally, depending upon the size of the fish, line 26 may be excessively stretched, or in a worst case may break, due to the increased drag. Thus, controller system 200 opens brake 50 when a strike is detected. Control then proceeds to step 2908.

In step 2908, controller system 200 maintains brake 50 in a low-drag configuration until a reset is performed by the fisherman. Thus, at this stage, the fisherman is reeling in the fish and when landed, the fisherman resets trolling system 30 allowing for continued fishing. When a reset is detected by controller system 200, through the pushing of on/off pushbutton 408, control proceeds to step 2902 where normal operation resumes.

Figure 27:
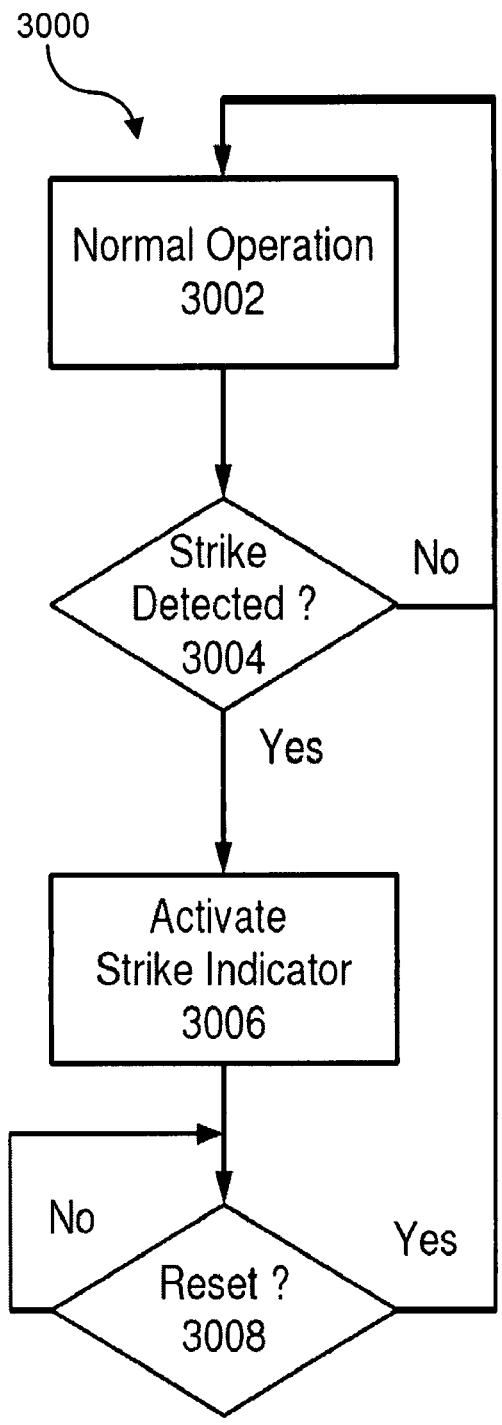
FIG. 27 is a flow diagram of a strike indicator for the trolling system of FIG. 3.

FIG. 27 is a flow diagram of a strike indicator 3000 for the trolling system of FIG. 3. In step 3002, trolling system 30 is performing under normal operation as described in detail with respect to control process 2400, which is described in detail with respect to FIG. 21.

Next, in step 3004, trolling system 30 determines if a strike has been detected (described in detail with respect to FIG. 26). If a strike has not been detected, control proceeds back to step 3002 where normal operation continues. If a strike is detected, control proceeds to step 3006.

In step 3006, a strike indicator is activated. The strike indicator may be a noise-making device (e.g., a piezo-electric alarm) or a light indicator (e.g., a narrow beam LED configured to target boat 22, or a wide beam LED or light source configured to be seen from a plurality of directions). The strike indicator then signals the fisherman that a strike has occurred and that the fish should be reeled in. Further, actions such as the placement of brake 50 in a reduced drag state may be accomplished to further assist the fisherman as described in detail with respect to FIG. 26. Control the proceeds to step 3008.

In step 3008, controller system 200 maintains the strike indicator in an on-state. When a reset is detected by controller system 200, through the pushing of on/off pushbutton 408, control proceeds to step 3002 where normal operation resumes.

Figure 28:
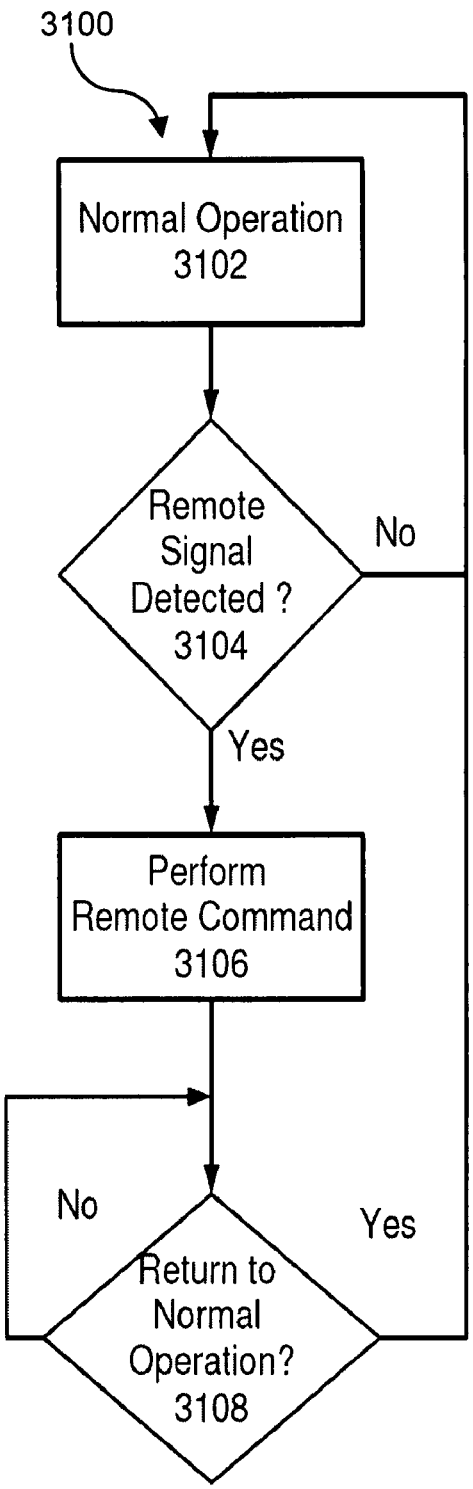
FIG. 28 is a flow diagram of remote signal commanding for the trolling system of FIG. 3.

FIG. 28 is a flow diagram of remote signal commanding 3100 for the trolling system of FIG. 3. In step 3102, trolling system 30 is performing under normal operation as described in detail with respect to control process 2400, which is described in detail with respect to FIG. 21.

Next in step 3104, controller system 200 is polling for a remote signal. The remote signal may be configured as a radio-type signal that is available to be received by an additional receiver within controller system 200. For example, but not limited to, a 300-400 MHz system may be used (similar to remote keyless entry systems for vehicles) to control trolling system 30 remotely. Signals from boat 22, sent by the fisherman, may include updates to the programming sequence or timing delays to brake 50. Such updates may come remotely to reduce the amount of time necessary to reel in trolling system 30 and reprogram. Further, where numerous trolling systems 30 are in use, the programs may be updated in real time without requiring hands-on programming. When controller system 200 detects a remote signal, control proceeds to step 3106. Otherwise, normal operation continues as control proceeds to step 3102.

In step 3106, controller system 200 performs the remote command after validating the command. The remote command may be to open brake 50 until a reset, change the open and closed programming delays, etc. When the remote command is performed, control proceeds to step 3108.

In step 3108, controller system 200 determines whether or not to return to normal operation. If a return to normal operation is warranted, e.g., after new programming has been performed such as the loading of new open and closed delay times, control proceeds to step 3102. Else, control remains at step 3108 until such time as a return to normal operation has been determined.

Figure 29:
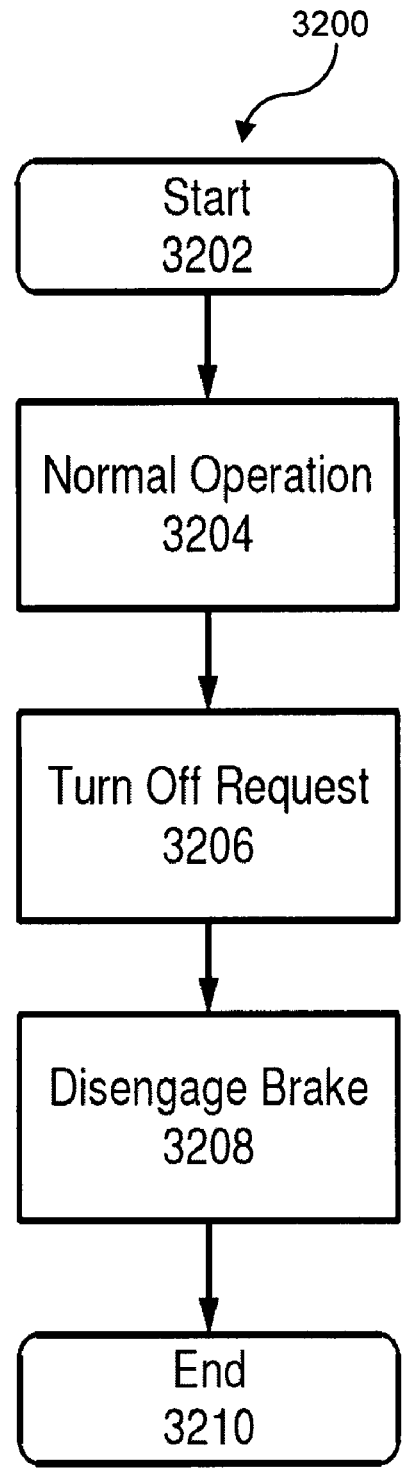
FIG. 29 is a flow diagram of a rough-sea mode where the brake is positioned in a low-drag configuration when the controller module is turned off.

FIG. 29 is a flow diagram of a rough-sea mode 3200 where the brake is positioned in a low-drag configuration when the controller module is turned off. Rough-sea mode 3200 begins at step 3202.

Next, at step 3204, trolling system 30 is performing under normal operation as described in detail with respect to control process 2400, which is described in detail with respect to FIG. 21.

Next, at step 3206, a request to turn off is determined by controller system 200. The request for powering off may come from on/off pushbutton 408 made by the fisherman Next, at step 3208, controller system 200 configures brake 50 for a rough-sea position that is where brake 50 is configured for a reduced drag position.

Next, at step 3210, controller system 200 turns off with brake 50 in a reduced drag configuration.

CONCLUSION

The saying "10% of the fishermen catch 90% of the fish" rings true. Better fishermen on average catch significantly more fish due to their knowledge, experience, skill, and attention to detail. Improvements in trolling skills and apparatuses have continuously allowed for better success than simply dragging a lure around in the water. Improved fishing systems for boats allow for quiet trolling, global positioning systems (GPS) allowing pinpointing of fishing locations and patterns, as well as autopilot systems to take the fishermen to the best locations are available. As systems have improved, fishermen now have boats available to get them to the appropriate location, electronics to locate fish, mapping of underwater structures, detection of thermoclines, depth, and water temperatures. All of these systems provide better information to fishermen to further improve the location and catching of fish.

Additionally, it is known in the art to spread lures away from the boat through the use of planer boards. Further, it is known that fish will attack a lure where the lure provides realistic "action." Thus, fishermen have attempted to control the depth of the lure through the actions of taking the boat in and out of gear, as well as steering in zigzag patterns. However, the techniques for providing action to a lure are complex, not easy to repeat consistently, take time and concentration away from the fishermen, as well as being generally abusive to the boat's drive system.

Hence, trolling system 30 provides for an improved trolling technique for controlling the critical aspects of speed and action of lure 36. Rather than controlling a standard planer board using boat movement, trolling system 30 allows for precise control of the lure from the planer board itself. Additionally, trolling system 30 allows for precise and repeatable control of lure 36.

Fishermen are now provided with an apparatus and method significantly advancing trolling techniques. Trolling system 30 provides for control of lure 36 depth and speed. The control of which is localized to trolling system 30 at planer board 40, rather than controlling boat 22 to impart motion to lure 36. Further, speed and depth control are programmable, variable, and repeatable through control of brake 50. Having trolling system 30 unburdens a fisherman from attempting to control lure 36 through the motion of the boat, and now allows the fisherman to concentrate on other fishing strategies, while lure 36 is behaving in a manner known to attract fish strikes. Thus, trolling system 30 captures the critical aspects of lure 36 depth and speed in a programmable system that does not require intervention by the fisherman.

Trolling system 30 provides the opportunity to cause any style of lure to have action in the water by changing speeds. Further, most lures will also adjust depths depending upon their configuration and buoyancy, or lack thereof. Trolling system 30 also provides variable timing options to make the speed and depth changes of lure 36 more or less dramatic in providing the fish strike attracting action. Such action is known by fisherman to attract strikes. Thus, the fisherman will typically hold a rod in their hands and "pump" the rod and lure in an attempt to attract fish. Thus, action is imparted to a lure by way of a tugging motion by the fisherman from the boat. Such an action requires the attention of the fisherman and it is not possible to "pump" multiple rods at the same time. Additionally, by requiring a fisherman to constantly "pump" the rod, the fisherman may become tired from the constant physical workout requirements.

The operation of trolling system 30 is very much indeed an advancement in fishing technology. In an example of use, a fisherman picks up a planer board (or other towed fishing body) and programs the delay times through pushbuttons. Then, the planer board loads programmed delays and begins operating brake 50. Next, a low light condition LED may be turned on so that the fisherman can see the action of the boards in the water. Then the board is attached to line 26 and placed in the water where it is pulled by boat 22.

Trolling system 30 then performs a rhythmic speed-up and slow-down action that is controlled by the timing determined by the fisherman. The fisherman then can determine the "fish on" condition by a faster than normal slow down action when brake 50 is closed, or a slower than normal advance when brake 50 is opened. Once it is determined a fish is on the hook, the fish is fought in the same was as using a standard planer board. Further, trolling system 30 is configured such that a fisherman may handle the planer boards in the same manner as a standard planer board because the mechanical and control systems are totally enclosed within planer board 40.

Additionally, planer board 40 of trolling system 30 allows for the "reading of the board" and "reading of the rod tips" to determine what is going on with lure 36 underwater. A preferred rod has the characteristic of good strength and having a sensitive tip. When brake 50 is in an increased drag state, the rod and rod top will be "loaded" more than when brake 50 is in a low drag state. The loading of rod 24 increases the rate of acceleration of planer board 40 when brake 50 transitions from a high drag configuration to a low drag configuration (e.g., when brake 50 disengages and a lurching forward of planer board 40 and lure 36 occurs). When this transition occurs, the lure rapidly starts forward which is the preferred motion to attract a fish strike. Additionally, a strike indicator may be used for smaller fish that may not significantly influence the motion of trolling system 30, and thus, are more difficult to detect by the fisherman watching rod 24 and planer board 40.

The system and method for trolling disclosed herein includes a planer board as an example of a towed fishing body. However, other types of towed fishing bodies are also appropriate for the application of the systems and methods disclosed. For example, the towed fishing body may be a downrigger or a lure, among other towed fishing bodies.

While the brake embodiments described herein are generally rotatable planar surfaces, other embodiments and equivalents are also contemplated. For example, the brake may include surfaces that may selectively extend directly outward from the towed fishing body. In another embodiment, panels may hingedly swing away from the towed fishing body to interrupt water flow. Alternatively, a normally free-rotating water wheel may be selectively stopped to brake a towed fishing body. The brake may also be, for example, a perforated surface that is moved into the water to create turbulence and reduce the hydrodynamic efficiency of the towed fishing body. Additionally, the brake may be embodied as a mechanism attached in-line with the towing line so as to selectively adjust the distance from a boat to the towed fishing body. Generally, the brake may be embodied as an apparatus or feature used to slow or stop the towed fishing body when under tow. Such slowing or stopping may be relative to the tow mechanism (e.g., a boat), the water, or both.

As discussed herein with regard to towing, the embodiments typically show a boat having a rod. The boat's movement in the water tows the fishing body by a fishing line. However, the towing mechanism may be considered the boat, the rod, the line, and/or a rod holder (e.g., a rod, a rod holder, a reel, etc.) Additionally, the towing may be accomplished by a powered craft or another body that is pulled or towed. Moreover, the towing is not necessarily the boat itself. An intermediate towed body having the towed fishing body disclosed herein is also considered the towing entity.

With regard to the engagement and disengagement of the brake disclosed herein, the timing may be programmable by a user, for example, by pushbutton. Alternatively, the timing may be read from a memory location, or determined by sensors that adapt the timing to water conditions. In other embodiment, timing may be determined by switches. When a mechanical and/or electro-mechanical actuator system is used, timing may be determined by mechanical programmability in selecting different gearing for example, for a geared motor-driven actuator. Moreover, if the power is derived from movement of the towed fishing body in the water, the size of a water wheel or rotary arm depending therefrom may be adjusted to provide timing. The timing may be periodic (e.g., a repetitious timing having a single period, or having a sequence of periods). In another embodiment, a pre-programmed profile that is in non-volatile memory may be used. Alternatively, a timing algorithm may be used to determine the engagement and disengagement of the brake. If periodicity is not required, for example where conditions lend themselves to random motion to improve the life-like effects of the lure, a specialized timing may be appropriate (for example, a slow-slow-fast-slow-fast that repeats). Long sequences may also be defined that recycle after completion. Alternatively, a fisherman could use a long sequence that does not repeat (e.g., the sequence stops after completion). This would allow the fisherman to complete the programmed profile and change profiles if no strikes occur during the operation of the profile.

The aforementioned advantages and operation of trolling system 30 are maintained by controller system 200. Thus, these improvements, programmability, and advantages to trolling are now available through literally the touch of a button. In order to power controller system 200, there is a battery pack having a water tight charging port for easily re-charging the system. The battery charging can be accomplished on board boat 22, in a vehicle with a 12 volt system, or indoors with a 12 volt AD/DC adapter. The entire electronic control will be water-proofed such that water intrusion will not be a concern. Further, an eight (8) hour operation without requiring a re-charging cycle is preferred so that a fisherman does not have the burden to discontinue trolling operations unnecessarily.

With regard to the processes, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes described herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The preceding description has been presented only to illustrate and describe exemplary embodiments of the methods and systems of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

I claim:

1. A system comprising:
    a towed fishing body configured for being towed partially above water and partially below water,
    a first attachment point connected to said towed fishing body and configured for attachment to a line for being pulled through water; and
    a second attachment point connected to said towed fishing body and configured for pulling a fishing lure behind said towed fishing body; and
    a selectively positionable rigid brake connected to said towed fishing body, wherein said selectively positionable rigid brake further comprises an engaged position and a disengaged position, said engaged position being configured to slow said towed fishing body, said disengaged position being configured to allow said towed fishing body to speed up after being slowed; and
    a housing having an inlet and an outlet for water, wherein said selectively positionable rigid brake blocks a flow of water through said housing in an engaged position, and wherein said selectively positionable rigid brake allows said flow of water through said housing in a disengaged position.

2. The system of claim 1, wherein said selectively positionable brake comprises a means for controlling the speed of said towed fishing body.

3. The system of claim 1, wherein said engaged position substantially blocks water flow past said selectively positionable rigid brake and said disengaged position substantially allows water flow past said selectively positionable rigid brake.

4. The system of claim 1, wherein said engaged position comprises a surface positioned to interfere with the towing of said towed fishing body.

5. The system of claim 1, wherein said selectively positionable rigid brake further comprises a moveable surface.

6. The system of claim 5, wherein said movable surface is substantially perpendicular to a direction of travel of said towed fishing body when in said engaged position, and wherein said movable surface is substantially parallel to said direction of travel of said towed fishing body when in said disengaged position.

7. The system of claim 1, wherein said selectively positionable rigid brake is programmable.

8. The system of claim 1, wherein said selectively positionable rigid brake is positioned to slow said towed fishing body for at least one of a periodic time, a predetermined interval, a predetermined profile.

9. A system comprising:
    a planer board having a first line attachment point configured to provide the planer board to be pulled through water, and a second line attachment point configured for pulling a fishing lure behind said planer board, the planer board being configured for being towed partially above water and partially below water; and
    a speed control positioned between said first line attachment point and said second line attachment point of said planer board, said speed control being a component of said planer board, whereby said planer board is used for fishing by being towed at least partially above water wherein said speed control comprises a selectively positionable rigid brake connected to said planer board, wherein said selectively positionable rigid brake further comprises an engaged position and a disengaged position, said engaged position being configured to slow said planer bard, said disengaged position being configured to allow said planer board to speed u after being slowed; and
    a housing having an inlet and an outlet for water, wherein said selectively positionable rigid brake blocks a flow of water through said housing in an engaged position, and wherein said selectively positionable rigid brake allows said flow of water through said housing in a disengaged position.

10. The system of claim 9, wherein said speed control selectively resists being towed.

11. The system of claim 10, wherein said resistance is substantially opposite a towed direction.

12. The system of claim 9, wherein said speed control is programmable to slow said planer board.

13. The system of claim 9, wherein said speed control slows said planer board at least one of a predetermined time, periodically, and at random intervals.

14. The system of claim 9, wherein said speed control further comprises a movable surface having an engaged position and a disengaged position, said engaged position interfering with water flow substantially proximal to said movable surface, said disengaged position substantially allowing water flow past said movable surface.

15. A trolling system comprising:
a towed fishing body configured for attachment to a line for being pulled through water;
a selectively positionable rigid brake attached to said towed fishing body, wherein said selectively positionable rigid brake comprises an engaged position and a disengaged position, said engaged position being configured to slow said towed fishing body, said disengaged position being configured to allow said towed fishing body to speed up after being slowed; and
a housing having an inlet and an outlet for water, wherein said selectively positionable rigid brake blocks a flow of water through said housing in the engaged position and wherein said selectively positionable rigid brake allows said flow of water through said housing in a disengaged position.

16. The system of claim 15, wherein said engaged position substantially blocks water flow past said selectively positionable rigid brake and said disengaged position substantially allows water flow past said selectively positionable rigid brake.

17. The system of claim 15, wherein said selectively positionable rigid brake is programmable.

18. The system of claim 15, wherein said selectively positionable rigid brake is positioned to slow said towed fishing body for at least one of a periodic time, a predetermined interval, a predetermined profile.

19. The system of claim 15, wherein said selectively positionable rigid brake further comprises a movable surface having an engaged position and a disengaged position, said engaged position interfering with water flow substantially proximal to said movable surface, said disengaged position substantially allowing water flow past said movable surface.

* * * * *